(12) United States Patent
Waymouth et al.

(10) Patent No.: US 6,479,685 B2
(45) Date of Patent: Nov. 12, 2002

(54) METALLOCENE CATALYSTS FOR SYNTHESIS OF HIGH-MELTING POLYOLEFIN COPOLYMER ELASTOMERS

(75) Inventors: Robert M. Waymouth, Palo Alto, CA (US); Raisa L. Kravchenko, Wilmington, DE (US); Jennifer Maciejewski Petoff, Belle Mead, NJ (US); Joyce Hung, Stanford, CA (US)

(73) Assignee: The Board of Trustees of the Leland Standard Junior University, Stanford, CA (US)

(*) Notice: Subject to any disclaimer, the term of this patent is extended or adjusted under 35 U.S.C. 154(b) by 0 days.

(21) Appl. No.: 09/752,373

(22) Filed: Dec. 29, 2000

(65) Prior Publication Data

US 2001/0049425 A1 Dec. 6, 2001

Related U.S. Application Data

(63) Continuation-in-part of application No. 09/227,228, filed on Jan. 8, 1999, now Pat. No. 6,169,151.
(60) Provisional application No. 60/071,050, filed on Jan. 9, 1998.

(51) Int. Cl.$^7$ .............................. C07F 17/00; C08F 4/44
(52) U.S. Cl. ........................ 556/53; 526/160; 526/943; 502/152
(58) Field of Search ................ 502/152; 556/53; 526/160, 943

(56) References Cited

U.S. PATENT DOCUMENTS

| | | | |
|---|---|---|---|
| 3,873,642 A | 3/1975 | Jezl | 260/878 |
| 4,334,040 A | 6/1982 | Fujii et al. | 525/321 |
| 4,668,752 A | 5/1987 | Tominari et al. | 526/348.2 |
| 4,677,172 A | 6/1987 | Zimmerman et al. | 526/159 |
| 4,792,595 A | 12/1988 | Cozewith et al. | 526/348 |
| 4,797,461 A | 1/1989 | Aubanel et al. | 526/348.6 |
| 4,871,705 A | 10/1989 | Hoel | 502/117 |
| 4,981,760 A | 1/1991 | Naito et al. | 428/523 |
| 5,001,205 A | 3/1991 | Hoel | 526/128 |
| 5,086,134 A | 2/1992 | Antberg et al. | 526/126 |
| 5,229,478 A | 7/1993 | Floyd et al. | 526/160 |
| 5,278,272 A | 1/1994 | Lai et al. | 526/348.5 |
| 5,459,217 A | 10/1995 | Todo et al. | 526/348.1 |
| 5,475,075 A | 12/1995 | Brant et al. | 526/348.3 |
| 5,491,207 A | 2/1996 | Hoel et al. | 526/129 |
| 5,585,448 A | 12/1996 | Resconi et al. | 526/170 |
| 5,747,621 A | * 5/1998 | Resconi et al. | 526/351 |
| 5,969,070 A | * 10/1999 | Waymouth et al. | 526/351 |

* cited by examiner

Primary Examiner—David W. Wu
Assistant Examiner—R. Harlan
(74) Attorney, Agent, or Firm—Jacques M. Dulin, Esq.; Innovation Law Group, Ltd.

(57) ABSTRACT

Metallocene catalysts having plural coordination geometries for synthesis of high melting polyolefin copolymers suitable as thermoplastic elastomers. The inventive catalysts comprise unbridged, substituted or unsubstituted cyclopentadienyl metallocene catalysts that are capable of interconverting between states with different polymerization or copolymerization characteristics, which interconversion is controlled by selecting the substituents of the cyclopentadienyl ligands so that the rate of interconversion of the two states is within several orders of magnitude of the rate of formation of a single polymer chain. Where $r_i > r_f$ the polymer can be characterized as multiblock; where $r_i < r_f$, the result is a polymer blend and where $r_i/r_f$ is close to 1, the resulting polymer is a mixture of blend and multiblock. The inventive metallocene catalysts are able to interconvert between more than two states, with embodiments of four states being shown in FIG. 2.

6 Claims, 3 Drawing Sheets

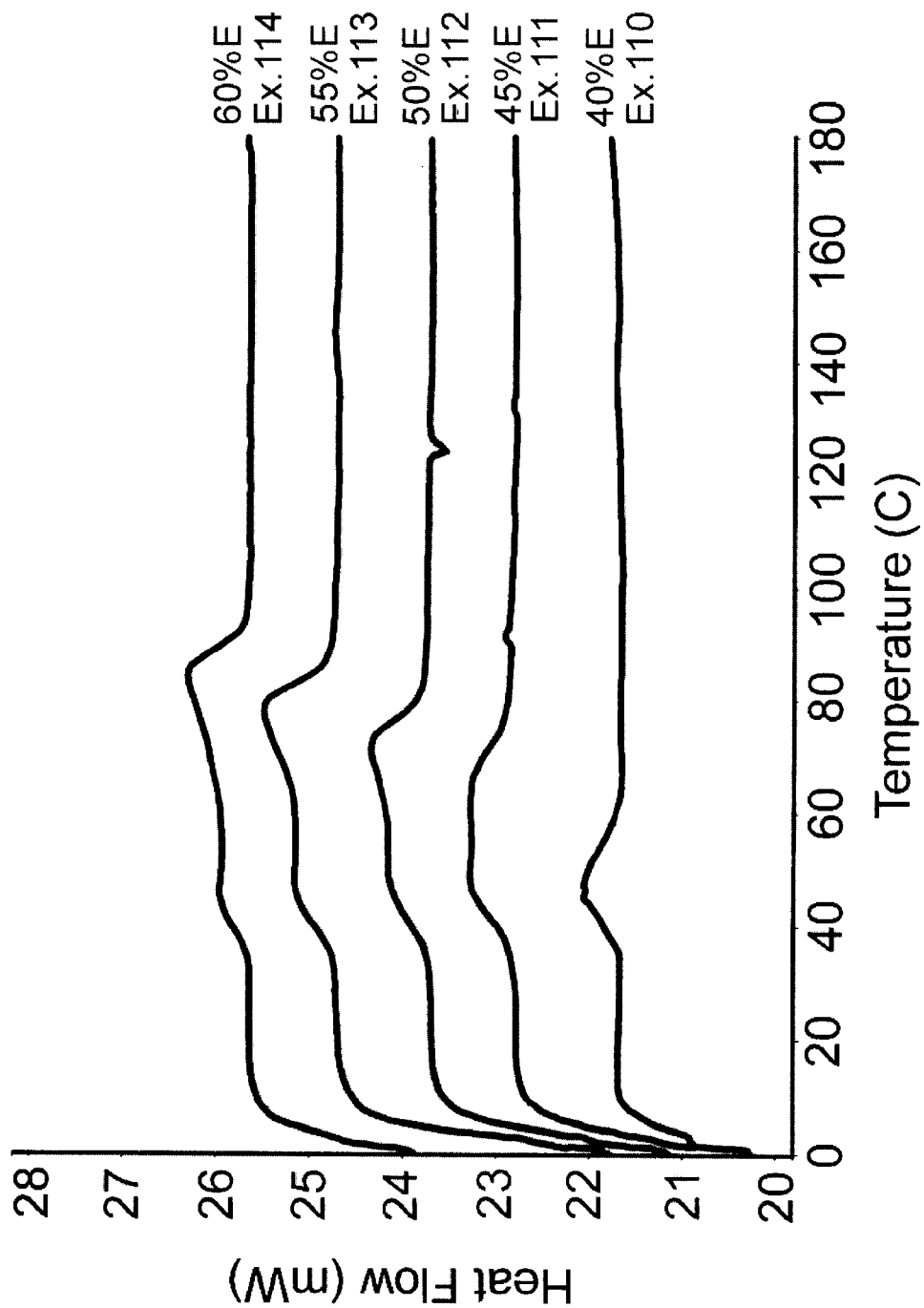
Figure 3. DSC Traces of Ethylene/Propylene Copolymers Containing 40-60% Ethylene, Made from 11/MAO

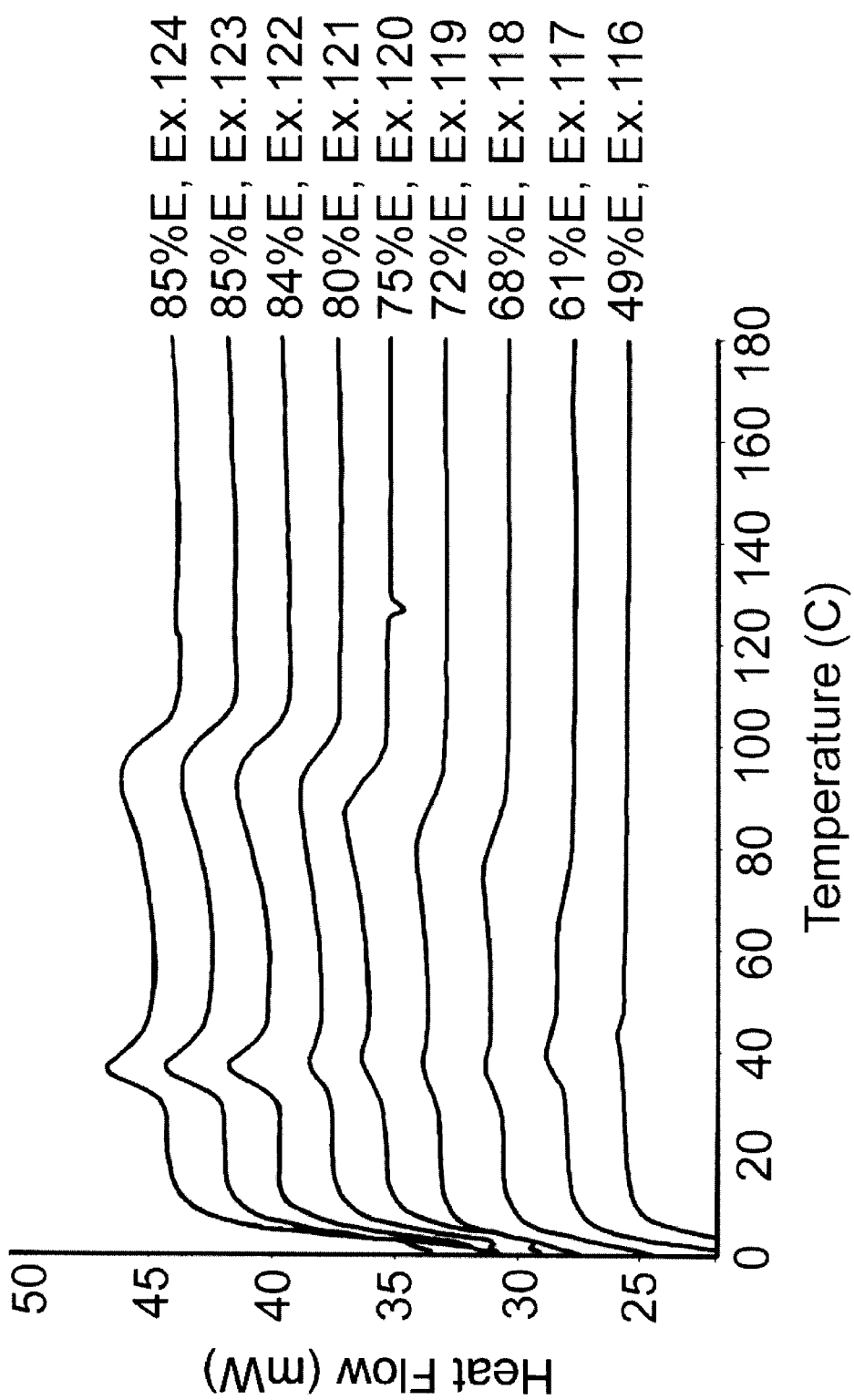
Figure 4. DSC Traces of Ethylene/1-Hexene Copolymers Containing 49-85% Ethylene, Made From 11/MAO

METALLOCENE CATALYSTS FOR SYNTHESIS OF HIGH-MELTING POLYOLEFIN COPOLYMER ELASTOMERS

CROSS REFERENCE TO RELATED APPLICATIONS

This application, and identical application Ser. No. 09/752,034 filed by the same inventors of even date herewith, are each a CIP of U.S. application Ser. No. 09/227,228 filed Jan. 8, 1999, now U.S. Pat. No. 6,169,151 Issued Jan. 2, 2001, which in turn is the regular application of an earlier filed Provisional application Serial No. 60/071, 050, entitled Catalyst and Process for Synthesis of Olefin Block Copolymers, filed Jan. 9, 1998 by Waymouth and Kravchenko, which applications are hereby incorporated by reference herein, and the benefit of the filing dates of which are hereby claimed under 35 U.S. Code §§112, 119 (e) and 120, and under appropriate provisions of the PCT rules.

TECHNICAL FIELD

This invention relates to high melting polyolefin copolymers suitable as thermoplastic elastomers and catalysts and methods for their synthesis. These olefin copolymers are characterized by low glass transition temperatures, melting points above about 90° C., high molecular weights, and a narrow composition distribution between chains. The copolymers of the invention are novel reactor blends that can be sequentially frationated into fractions of differing crystallinities, said fractions nevertheless show compositions of comonomers which differ by less than 15% from the parent reactor blend. The invention also relates to a process for producing such copolymers by utilizing an unbridged metallocene catalyst that is capable of interconverting between states with different copolymerization characteristics.

BACKGROUND

Ethylene alpha-olefin copolymers are important commercial products. These copolymers find a particularly broad range of application as elastomers. There are generally three family of elastomers made from such copolymers. One class is typified by ethylene-propylene copolymers (EPR) which are saturated compounds, optimally of low crystallinity, requiring vulcanization with free-radical generators to achieve excellent elastic properties. Another type of elastomer is typified by ethylene-propylene terpolymers (EPDM), again optimally of low crystallinity, which contain a small amount of a non-conjugated diene such as ethylidene norbornene. The residual unsaturation provided by the diene termonomomer allows for vulcanization with sulfur, which then yields excellent elastomeric properties. Yet another class is typified by ethylene-alpha olefin copolymers of narrow composition distribution which possess excellent elastomeric properties even in the absence of vulcanization. For example U.S. Pat. No. 5,278,272, to Dow describes a class of substantially linear polyolefin copolymer elastomers with narrow composition distribution and excellent processing characteristics. (These latter class of elastomers are typified for example by the EXACT$_{tm}$ and ENGAGE$_{tm}$ brand products sold commercially by Exxon and Dow, respectively.) One of the limitations of the latter class of elastomers is the low melting temperature of these materials which limits their high temperature performance.

Hence it would be extremely advantageous to industry to produce copolymers of ethylene and alpha olefins which would show both elastomeric properties in the unvulcanized state and high melting points.

THE INVENTION

Summary Objects and Advantages

It is among the objects of this invention to provide methods of production of a class of novel polyolefin copolymers with a combination of interesting and useful physical characteristics, including a molecular weight distribution, $M_w/M_n </= 10$, a narrow composition distribution, $</= 15\%$, high melting point index, melting points greater than about 90° C. and elastomeric properties. It is a further object of this invention to produce a novel family of crystallizable, high-melting polyolefin copolymers having a narrow composition distribution where the melting point of the polymer is greater than about 90° C. It is a further object of this invention to produce a class of high-melting, multiblock, blend, and multiblockiblend polyolefin copolymer elastomers. These novel polymers are useful as elastomeric and/or thermoplastic materials as well as compatibilizers for other polyolefin blends.

We have unexpectedly found that it is possible to prepare high melting polyolefin elastomers of narrow composition distribution using novel unbridged metallocenes as olefin polymerization catalysts. For convenience, certain terms used throughout the specification are defined below (with "$</=$" or "$>/=$" meaning less than or equal to, or greater than or equal to):

a. "Multiblock" polymer or copolymer means a polymer comprised of multiple block sequences of monomer units where the structure or composition of a given sequence differs from that of its neighbor. Furthermore a multiblock copolymer as defined herein will contain a given sequence at least twice in every polymer chain.

b. The term "composition distribution" refers to the variation in comonomer composition between different polymer chains and can be described as a difference, in mole percent, of a given weight percent of a sample from the mean mole percent composition. The distribution need not be symmetrical around the mean; when expressed as a number, for example 15%, this shall mean the larger of the distributions from the mean.

c. As used herein, the term "elastomeric" refers to a material which tends to regain its shape upon extension, such as one which exhibits a positive power of recovery at 100, 200 and 300% elongation.

d. The term "melting point index", also referred-to as $MPI = T_m/X_c$, means the ratio of the melting point of the copolymer, $T_m$, to the mole fraction of the crystallizable component, $X_c$. By crystallizable component, we mean a monomer component whose homopolymer is a crystalline polymer. The melting point is taken as a maximum in a melting endotherm, as determined by differential scanning calorimetry.

The copolymers of the present invention have the following characteristics:

(a) a mole fraction of crystallizable component $X_c$ from 30–99%;

(b) a molecular weight distribution $M_w/M_n </= 10$; and (c) melting points above about 90° C.;

which copolymers comprise from 0–70% by weight of an ether soluble fraction, and from 0–95% of a hexanes soluble fraction which can exhibit a melting range up to about 125° C., and from 0–95% of a hexanes insoluble fraction which can exhibit a melting range up to about 142° C.

The copolymers of the present invention in one embodiment can be characterized as reactor blends in that they can be fractionated into fractions of differing degrees of crystallinity and differing melting points. Nevertheless, the comonomer composition of the various fractions of the copolymers are within 15% of the composition of the resultant polymer product produced in the reactor.

The melting points of the copolymers of the present invention are high, typically above 90° C. and the melting point indices, $T_m/X_c$ are also high, typically above 80 ° C. and preferably above 115° C. The fractions can also exhibit high melting point indices. For example, it is possible to isolate a hexanes soluble fraction from the copolymers of the present invention that exhibits a melting point as high as 115° C. and a melting point index as high as 160° C. The glass transition temperatures of the copolymers are low, typically less than –20° C. and preferably below –50° C.

The molecular weights of the polymers of the present invention can be quite high, with weight average molecular weights in excess of $M_w=1,000,000$ readily obtained and molecular weights as high as 2,000,000 observed. The molecular weight distributions of the copolymers are typically $M_w/M_n</=10$, preferably $M_w/M_n</=8$ and most preferably $</=6$.

In one embodiment, the copolymers of the present invention exhibit useful elastomeric properties. They can be used in a variety of applications typical of amorphous or partially crystalline elastomers and as compatibilizers for copolymer blends.

While not wishing to be bound by theory, it is believed that in the process of the invention, different active species of the catalyst are in equilibrium during the construction of the copolymer chains. This is provided for in the present invention by a class of unbridged metallocenes that are capable of isomerizing between states that have different copolymerization characteristics during the polymerization process. This process can thus lead to multiblock copolymers or copolymer blends where the blocks or components of the blends have different compositions of comonomers.

One embodiment of the invention includes metallocene catalysts which are able to interconvert between states whose coordination geometries are different. Thus, the invention includes selecting the substituents of the metallocene cyclopentadienyl ligands so that the rate of interconversion of the two states is within several orders of magnitude of the rate of formation of a single polymer chain. That is, if the rate of interconversion between states of the catalyst, $r_i$, is greater than the rate of formation of an individual polymer chain, $r_p$, on average, the polymer resulting from use of the inventive process and catalysts can be characterized as multiblock (as defined above). If the rate of interconversion is less than the rate of formation, the result is a polymer blend. Where the rates are substantially balanced, the polymer can be characterized as a mixture of blend and multiblock. There may be a wide range of variations and intermediate cases amongst these three exemplars.

The nature of the substituents on the cyclopentadienyl ligands is critical; the substitution pattern of the cyclopentadienyl ligands should be such that the coordination geometries are different in order to provide for different reactivities toward ethylene and other alpha olefins while in the two states (see FIG. 1) and that the rate of interconversion of the states of the catalyst are within several orders of magnitude of the rate of formation of a single chain.

A further embodiment includes metallocene catalysts which are able to interconvert between more than two states whose coordination geometries are different. This is provided for by metallocenes with cyclopentadienyl-type ligands substituted in such a way that more than two stable states of the catalyst have coordination geometries that are different, for example, a catalyst with four geometries is illustrated in one embodiment in FIG. 2.

According to the process of this invention, the properties of the copolymers can be controlled by changing the nature of the cyclopentadienyl units on the catalysts, by changing the nature of the metal atom in the catalyst, by changing the nature of the comonomers and the comonomer feed ratio, and by changing the temperature.

The molecular weights of the polymers produced with the catalysts of the invention are very high. The molecular weight of the polymer product can be controlled, optionally, by controlling the temperature or by adding any number of chain transfer agents such as hydrogen or metal alkyls, as is well known in the art.

The catalyst system of the present invention consists of the transition metal component metallocene in the presence of an appropriate cocatalyst. In broad aspect, the transition metal compounds have the formula:

Formula 1 in which M is a Group 3, 4 or 5 Transition metal, a Lanthanide or an Actinide, X and X' are the same or different uninegative ligands, such as but not limited to hydride, halogen, hydrocarbyl, halohydrocarbyl, amine, amide, or borohydride substituents (preferably halogen, alkoxide, or $C_1$ to $C_7$ hydrocarbyl), and L and L' are the same or different polynuclear hydrocarbyl, silahydrocarbyl, phosphahydrocarbyl, azahydrocarbyl, arseni-hydrocarbyl or borahydrocarbyl rings, typically a substituted cyclopentadienyl ring or heterocyclopentadienyl ring, in combination with an appropriate cocatalyst. Exemplary preferred Transition Metals include Titanium, Haffiium, Vanadium, and, most preferably, Zirconium. An exemplary Group 3 metal is Yttrium, a Lanthanide is Samarium, and an Actinide is Thorium.

Preferably L and L' have the formula:

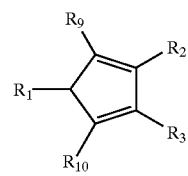

Formula 2 where $R_1$, $R_2$, $R_3$, $R_9$, and $R_{10}$ may be the same or different hydrogen, alkyl, alkylsilyl, aryl, benzyl, alkoxyalkyl, alkoxyaryl, alkoxysilyl, aminoalkyl, aminoaryl, branched alkyl, or substituted alkyl, alkylsilyl or aryl substituents of 1 to about 30 carbon atoms.

Ligands of this general structure include substituted cyclopentadienes. Other ligands L and L' of Formula 2 for the production of propylene-ethylene copolymers include substituted cyclopentadienes of the general formula:

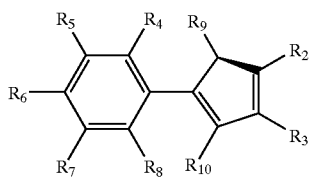

where $R_2$–$R_{10}$ have the same definition as $R_1$, $R_2$, $R_3$, $R_9$, and $R_{10}$ above. Preferred cyclopentadienes of Formula 3 include 3,4-dimethyl-1-phenyl-1,3-cyclopentadiene ($R_2=R_3=CH_3$, $R_6=H$); 3,4-dimethyl-1-p-tolyl-1,3-cyclopentadiene ($R_2=R_3=CH_3$, $R_6=CH_3$); 3,4,-dimethyl-1-(3,5-bis(trifluoromethyl)phenyl)-1,3-cyclopentadiene ($R_2=R_3=CH_3$, $R_6=CF_3$); and 3,4-dimethyl-1-(4-tert-butylphenyl)-1,3-cyclo-pentadiene ($R_2=R_3=CH_3$, $R_6=tBu$).

Alternately preferred L and L' of Formula 1 include ligands of Formula 2 wherein $R_1$ is an aryl group, such as a substituted phenyl, biphenyl, or naphthyl group, and $R_2$ and $R_3$ are connected as part of a ring of three or more carbon atoms. Especially preferred for L or L' of Formulas 1–3 for producing the copolymers of this invention are substituted indenyl ligands, more particularly 2-arylindene of formula:

Formula 4

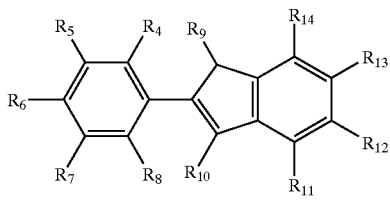

where $R_4$–$R_{14}$ may be the same or different hydrogen, halogen, aryl, benzyl, hydrocarbyl, silahydrocarbyl, or halohydrocarbyl substituents. That is, $R_1$ of Formula 2 is $R_4$–$R_8$-substituted benzene, and $R_2$, $R_3$ are cyclized in a 6-carbon ring to form the indene moiety.

Particularly preferred 2-aryl indenes include at present as preferred best mode compounds: 2-phenylindene (Ligand C); 1-methyl-2-phenyl indene (Ligand D); 2-(3,5-dimethylphenyl)indene; 2-(3,5-bis-trifluoromethylphenyl)indene (Ligand A); 1-methyl-2-(3,5-bis-trifluoromethylphenyl)indene (Ligand B); 2-(3,5-bis-tertbutylphenyl)indene; 1-methyl-2-(3,5-bis-tertbutylphenyl)indene; 2-(3,5-bis-trimethyl- silylphenyl)indene; 1-methyl-2-(3,5-bis-trimethylsilylphenyl)indene; 2-(4-fluorophenyl)indene; 2-(2,3,4,5-tetrafluorophenyl)indene; 2-(2,3,4,5,6-pentafluorophenyl)indene; 2-(1-naphthyl)indene; 2-(2-naphthyl)indene; 2-[(4-phenyl)phenyl]indene; 2-[(3-phenyl)phenyl]indene; 1-benzyl-2-phenylindene; and 1-benzyl-2(3,5-bis-tertbutylphenyl) indene (Ligand E).

Preferred metallocenes according to the present invention include both bis ligand (two identical ligands) and mixed ligands (the ligands are not identical) metallocenes having any combination of the above aryl indenes (and their sterically functionally hindering equivalents), such as but not limited to:
bis(2-phenylindenyl)zirconium dichloride;
bis(2-phenylindenyl)zirconium dimethyl;
bis(1-methyl-2-phenylindenyl)zirconium dichloride;
bis(1-methyl-2-phenylindenyl)zirconium dimethyl;
bis[2-(3,5-dimethylphenyl)indenyl]zirconium dichloride;
bis[2-(3,5-bis-trifluoromethylphenyl)indenyl]zirconium dichloride;
bis[2-(3,5-bis-tertbutylphenyl)indenyl]zirconium dichloride;
bis[2-(3,5-bis-trimethylsilylphenyl)indenyl]zirconium dichloride;
bis[2-(4,-fluorophenyl)indenyl]zirconium dichloride;
bis[2-(2,3,4,5,-tetraflorophenyl)indenyl]zirconium dichloride;
bis(2-(2,3,4,5,6-pentafluorophenyl)indenyl])zirconium dichloride;
bis[2-(1-naphthyl)indenyl]zirconium dichloride;
bis(2-(2-naphthyl)indenyl])zirconium dichloride;
bis(2-[(4-phenyl)phenyl]indenyl])zirconium dichloride;
bis[2-[(3-phenyl)phenyl]indenyl]zirconium dichloride;
(pentamethylcyclopentadienyl)(1-methyl-2-phenylindenyl)zirconium dichloride;
(pentamethylcyclopentadienyl)(2-phenylindenyl)zirconium dichloride;
(pentamethylcyclopentadienyl)(1-methyl-2-phenylindenyl)zirconium dimethyl;
(pentamethylcyclopentadienyl)(2-phenylindenyl)zirconium dimethyl;
(cyclopentadienyl)(1-methyl-2-phenylindenyl)zirconium dichloride;
(cyclopentadienyl)(2-phenylindenyl)zirconium dichloride;
(cyclopentadienyl)(1-methyl-2-phenylindenyl)zirconium dimethyl;
(cyclopentadienyl)(2-phenylindenyl)zirconium dimethyl;
(1-methyl-2-phenylindenyl)(2-phenylindenyl)zirconium dichloride (i.e., Ligands D and C, Metallocene 6, Table 3);
(1-methyl-2-phenylindenyl)[2-(3,5-bis-trifluoromethylphenyl)indenyl]zirconium dichloride (i.e., Ligands D and A, Metallocene 8, Table 3);
[1-methyl-2-(3,5-bis-trifluoromethylphenyl)indenyl](2-phenylindenyl)zirconium dichloride (i.e., Ligands B and C, Metallocene 7, Table 3);
[1-methyl-2-(3,5-bis-trifluoromethylphenyl)indenyl][2-(3,5-bis-trifluoromethyphenyl)indenyl]zirconium dichloride (i.e., Ligands B and A, Metallocene 9, Table 3);
(1-methyl-2-phenylindenyl)[2-(3,5-bis-tertbutylphenyl)indenyl]zirconium dichloride;
(2-phenylindenyl)(1-benzyl-2-phenylindenyl)zirconium dichloride;
(2-phenylindenyl)[2-(3,5-bis-trifluoromethylphenyl)indenyl]zirconium dichloride (i.e., Ligands C and A);
[2-(3,5-bis-trifluoromethylphenyl)indenyl][1-benzyl-2-(3,5-bis-tertbutylphenyl)indenyl]zirconium dichloride (i.e., Ligands A and E);
(2-phenylindenyl)][1-benzyl-2-(3,5-bis-tertbutylphenyl)indenyl]zirconium dichloride (i.e., Ligands C and E, Metallocene 11);
and the corresponding hafnium compounds such as:
bis(2-phenylindenyl)hafnium dichloride;
bis(2-phenylindenyl)hafnium dimethyl;
bis(1-methyl-2-phenylindenyl)hafnium dichloride;
bis(1-methyl-2-phenylindenyl)hafnium dimethyl;
bis[2-(3,5-dimethylphenyl)indenyl]hafnium dichloride;
bis[2-(3,5-bis-trifluoromethyphenyl)indenyl]hafnium dichloride;
bis[2-(3,5-bis-tertbutylphenyl)indenyl]hafnium dichloride;
bis[2-(3,5-bis-trimethylsilylphenyl)indenyl]hafnium dichloride;
bis[2,(4-fluorophenyl)indenyl]hafnium dichloride;
bis[2-(2,3,4,5-tetrafluorophenyl)indenyl]hafnium dichloride;
bis[2-(2,3,4,5,6-pentafluorophenyl)indenyl]hafnium dichloride;
bis[2-(1-naphthyl)indenyl]hafnium dichloride;

bis[2-(2-naphthyl)indenyl]hafnium dichloride;
bis(2-((4-phenyl)phenyl)indenyl])hafnium dichloride;
bis[2-[(3-phenyl)phenyl]indenyl]hafnium dichloride;
(pentamethylcyclopentadienyl)(1-methyl-2-phenylindenyl) hafnium dichloride;
(pentamethylcyclopentadienyl)(2-phenylindenyl)hafnium dichloride;
(pentamethylcyclopentadienyl)(1-methyl-2-phenylindenyl) hafnium dimethyl;
(pentamethylcyclopentadienyl)(2-phenylindenyl)hafnium dimethyl;
(cyclopentadienyl)(1-methyl-2-phenylindenyl)hafnium dichloride;
(cyclopentadienyl)(2-phenylindenyl)hafnium dichloride;
(cyclopentadienyl)(1-methyl-2-phenylindenyl)hafnium dimethyl;
(cyclopentadienyl)(2-phenylindenyl)hafnium dimethyl;
(1-methyl-2-phenylindenyl)(2-phenylindenyl)hafnium dichloride (Ligands D and C);
(1-methyl-2-phenylindenyl)[2-(3,5-bis-trifluoromethylphenyl)indenyl]hafnium dichloride (Ligands D and A);
[1-methyl-2-(3,5-bis-trifluoromethylphenyl)indenyl](2-phenylindenyl)hafnium dichloride (Ligands B and C);
[1-methyl-2-(3,5-bis-trifluoromethylphenyl)indenyl][2-(3,5-bis-trifluoromethylphenylindenyl]hafnium dichloride (Ligands B and A);
(1-methyl-2-phenylindenyl)[2-(3,5-bis-tertbutylphenyl) indenyl]hafnium dichloride;
(2-phenylindenyl)(1-benzyl-2-phenylindenyl)hafnium dichloride;
(2-phenylindenyl)[2-(3,5-bis-trifluoromethylphenyl) indenyl]hafnium dichloride (i.e., Ligands C and A);
[2-(3,5-bis-trifluoromethylphenyl)indenyl][1-benzyl-2-(3,5-bis-tertbutylphenyl)indenyl]hafnium dichloride (i.e., Ligands A and E);
(2-phenylindenyl)][1-benzyl-2-(3,5-bis-tertbutylphenyl) indenyl]hafnium dichloride (i.e., Ligands C and E); and the like.

Other metallocene catalyst components of the catalyst system according to the present invention include:
bis(3,4-dimethyl-1-phenylcyclopentadienyl)zirconium dichloride;
bis(3,4-dimethyl-1-p-tolylcyclopentadienyl)zirconium dichloride;
bis(3,4-dimethyl-1-(3,5 bis(trifluoromethyl)phenyl) cyclopentadienyl)zirconium dichloride;
bis(3,4-dimethyl-1-(4-tert-butylphenyl)cyclopentadienyl) zirconium dichloride;
(3,4-dimethyl-1-phenyl-1,3-cyclopentadiene)(3,4-dimethyl-1-p-tolylcyclopentadienyl)zirconium dichloride;
(3,4-dimethyl-1-phenylcyclopentadienyl)(3,4-dimethyl-1-(3,5 bis(trifluoromethyl)phenyl)cyclopentadienyl) zirconium dichloride;
(3,4-dimethyl-1-phenylcyclopentadienyl)(3,4-dimethyl-1-(4-tert-butylphenyl)cyclopentadienyl)zirconium dichloride;
and the corresponding hafnium compounds, such as:
bis(3,4-dimethyl-1-phenylcyclopentadienyl)hafnium dichloride;
bis(3,4-dimethyl-1-p-tolylcyclopentadienyl)hafnium dichloride;
bis(3,4-dimethyl-1-(3,5 bis(trifluoromethyl)phenyl) cyclopentadienyl)haffium dichloride;
bis(3,4-dimethyl-1-(4-tert-butylphenyl)cyclopentadienyl) hafnium dichloride;
(3,4-dimethyl-1-phenylcyclopentadienyl)(3,4-dimethyl-1-p-tolylcyclopentadienyl)hafnium dichloride;
(3,4-dimethyl-1-phenylcyclopentadienyl)(3,4-dimethyl-1-(3,5 bis(trifluoromethyl)phenyl)cyclopentadienyl) hafnium dichloride;
(3,4-dimethyl-1-phenylcyclopentadienyl)(3,4-dimethyl-1-(4-tert-butylphenyl)cyclopentadienyl)hafnium dichloride; and the like.

It should be understood that other unbridged, rotating, non-rigid, fluxional metallocenes may be employed in the methods of this invention, including those disclosed in our above-identified Provisional application, which is hereby incorporated by reference to extent needed for support.

The Examples disclose a method for preparing the metallocenes in high yield. Generally, the preparation of the metallocenes consists of forming the indenyl ligand followed by metallation with the metal tetrahalide to form the complex.

Appropriate cocatalysts include alkylaluminum compounds, methylaluminoxane, or modified methylaluminoxanes of the type described in the following references: U.S. Pat. No. 4,542,199 to Kaminsky, et al,; Ewen, J. Am. Chem. Soc., 106 (1984), p. 6355; Ewen, et al., J. Am. Chem. Soc. 109 (1987) p. 6544; Ewen, et al., J. Am. Chem. Soc. 110 (1988), p. 6255; Kaminsky, et al, Angew. Chem., Int. Ed. Eng. 24 (1985), p. 507. Other cocatalysts which may be used include Lewis or protic acids, such as $B(C_6F_5)_3$ or $(PhNMe_2H)^+B(C_6F_5)_4^-$, which generate cationic metallocenes with compatible non-coordinating anions in the presence or absence of alkyl-aluminum compounds. Catalyst systems employing a cationic Group 4 metallocene and compatible non-coordinating anions are described in European Patent Applications 277,003 and 277,004 filed on 27.01.88 by Turner, et al.; European Patent Application 427,697-A2 filed on Sep. 10, 1990 by Ewen, et al.; Marks, et al., J. Am. Chem. Soc., 113 (1991), p. 3623; Chien, et al., J. Am. Chem. Soc., 113 (1991), p. 8570; Bochmann et al., Angew. Chem. Intl., Ed. Engl. 7 (1990), p. 780; and Teuben et al., Organometallics, 11 (1992), p. 362, and references therein.

The catalysts of the present invention comprise un-bridged, non-rigid, fluxional metallocenes which can change their geometry with a rate that is within several orders of magnitude of the rate of formation of a single polymer chain, on average. In accordance with the invention, the relative rates of interconversion and of formation can be controlled by selecting the substituents (or absence thereof) of the cyclopentadienyl ligands so that they can alternate in structure between states of different coordination geometries which have different selectivity toward a particular comonomer.

In one of many embodiments, these catalyst systems can be placed on a suitable support such as silica, alumina, or other metal oxides, $MgCl_2$ or other supports. These catalysts can be used in the solution phase, in slurry phase, in the gas phase, or in bulk monomer. Both batch and continuous polymerizations can be carried out. Appropriate solvents for solution polymerization include liquified monomer, and aliphatic or aromatic solvents such as toluene, benzene, hexane, heptane, diethyl ether, as well as halogenated aliphatic or aromatic solvents such as $CH_2Cl_2$, chlorobenzene, fluoro benzene, hexaflourobenzene or other suitable solvents. Various agents can be added to control the molecular weight, including hydrogen, silanes and metal alkyls such as diethylzinc.

The metallocenes of the present invention, in the presence of appropriate cocatalysts, are useful for the homopolymerization and co-polymerization of alpha-olefins, such as propylene, 1-butene, 1-pentene, 4-methyl-1-pentene, 1-hexene, 1-octene, and combinations thereof, and of copolymerization with ethylene. The polymerization of olefins is carried out by contacting the olefin(s) with the catalyst systems comprising the transition metal component and in the presence of an appropriate cocatalyst, such as an aluminoxane, a Lewis acid such as $B(C_6F_5)_3$, or a protic acid in the presence of a non-coordinating counterion such as $B(C_6F_5)_4^-$.

The metallocene catalyst systems of the present invention are particularly useful for the polyrnerization of ethylene and alpha-olefin comonomers as well as alpha-olefin monomer mixtures to produce co-polymers with novel elastomeric properties. The properties of elastomers are characterized by several variables. The tensile set (TS) is the elongation remaining in a polymer sample after it is stretched to an arbitary elongation (e.g. 100% or 300%) and allowed to recover. Lower set indicates higher elongational recovery. Stress relaxation is measured as the decrease in stress (or force) during a time period (e.g. 30 sec. or 5 min.) that the specimen is held at extension. There are various methods for reporting hysteresis during repeated extensions. In the present application, retained force is measured as the ratio of stress at 50% elongation during the second cycle recovery to the initial stress at 100% elongation during the same cycle. Higher values of retained force and lower values of stress relaxation indicate stronger recovery force. Better general elastomeric recovery properties are indicated by low set, high retained force and low stress relaxation.

BRIEF DESCRIPTION OF THE DRAWINGS

The invention is described, inter alia, with reference to the drawings, in which:

FIG. 3 is a graph of DSC traces of ethylene/propylene copolymers, containing 40–60% ethylene in accordance with Examples 110 through 114; and FIG. 4 is a graph of DSC traces of ethylene/1-hexene copolymers, containing 49–85% ethylene in accordance with Examples 116 through 124.

DETAILED DESCRIPTION INCLUDING THE BEST MODE OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what are presently believed to be the best modes of carrying out the inventions.

In this regard, the invention is illustrated in the several examples, and is of sufficient complexity that the many aspects, interrelationships, and sub-combinations thereof simply cannot be fully illustrated in a single example. For clarity and conciseness, several of the examples show, or report only aspects of a particular feature or principle of the invention, while omitting those that are not essential to or illustrative of that aspect. Thus, the best mode embodiment of one aspect or feature may be shown in one example or test, and the best mode of a different aspect will be called out in one or more other examples, tests, structures, formulas, or discussions.

Figure 1:
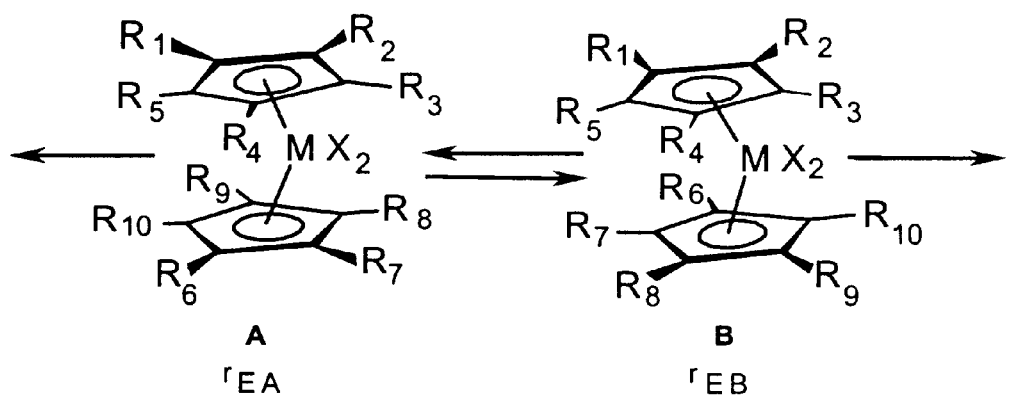
FIG. 1 is a stereoisomeric representation of unbridged metallocenes of this invention having different substituents in the positions $R_1$ through $R_{10}$ with the arrows showing the interconversion between states A and B in which the reactivity toward ethylene, $r_E$, and other alpha olefins differs in the two states.

The metallocene catalysts of the present invention are represented in one embodiment in FIG. 1 where the ligands L and L' are substituted cyclopentadienyl rings. As shown in the Figure, in state A cyclopentadienyl substituents $R_1$, $R_2$ and $R_6$ and $R_7$ project over the ligands X=X' whereas in state B, cyclopentadienyl substituents $R_1$, $R_2$ and $R_8$ and $R_9$ project over the ligands X=X'. As provided for in the process of this invention, catalysts derived from these metallocenes where substituents $R_6$ and $R_7$ are different from $R_8$ and $R_9$ will exhibit reactivity ratios for ethylene in state A ($r_{EA}$) different from that in state B ($r_{EB}$).

Figure 2:
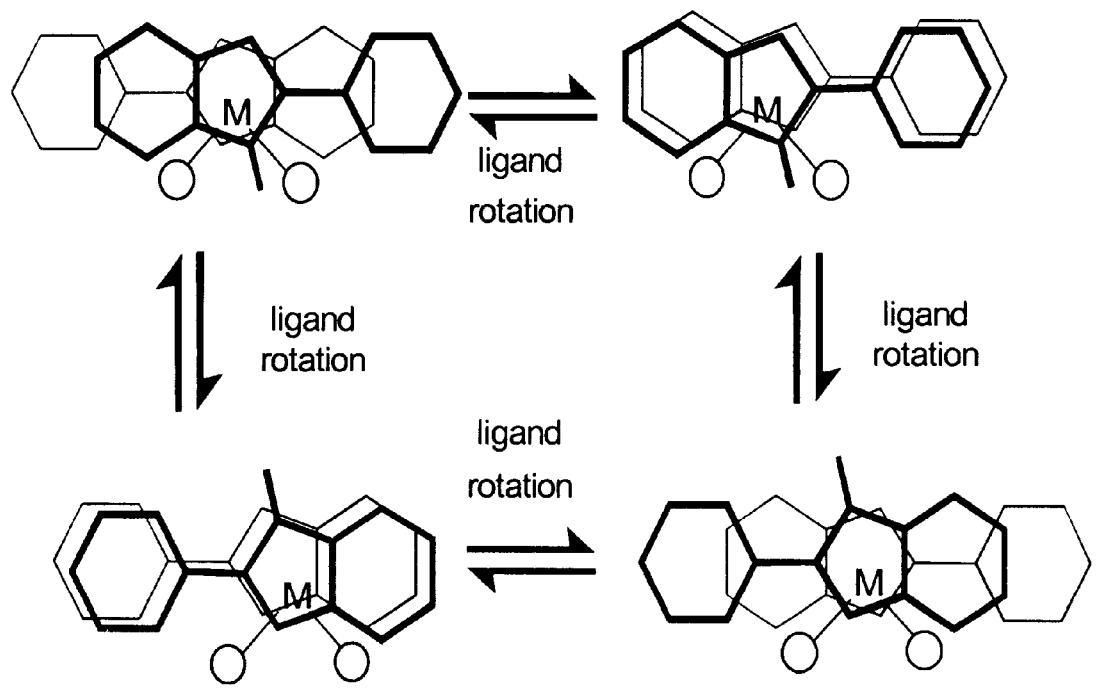
FIG. 2 shows four possible coordination geometries for unbridged metallocenes of this invention, with the circles representing coordination sites for olefin insertion

Another embodiment of the invention is illustrated in FIG. 2 where the ligands L and L' are different substituted 2-arylindenyl ligands such that the metallocene interconverts between four states with different coordination geometries. As shown in the Figure, in two states a methyl group projects over the coordination sites for olefin insertion (represented in this figure by circles) and in two states the methyl group projects away from the coordination sites for the olefin. The following examples illustrate the control of the polymer properties via selection of the ligand substitution groups.

EXAMPLES

All organometallic reactions were conducted using standard Schlenk and drybox techniques. Elemental analyses were conducted by E+R Microanalytical Laboratory. Unless otherwise specified all reagents were purchased from commercial suppliers and used without further purification. 2-Phenylindene, 1-methyl-2-phenylindene, 2-(bis(3',5'-trifluoromethyl)phenylindene, bis(2-phenylindenyl) zirconium dichloride, rac- and meso-bis(1-methyl-2-phenylindenyl)zirconium dichloride, ethylene-bis(indenyl) zirconium dichloride and bis(2-(bis(3',5'-trifluoromethyl) phenylindenyl)-zirconium dichloride were prepared according to the literature procedures.(Kravchenko, R.; Waymouth, R. M. *Macromolecules* 1998, 31, 1–6.) Hexane, pentane and methylene chloride used in organometallic synthesis were distilled from calcium hydride under nitrogen. Tetrahydrofuran was distilled from sodium/benzophenone under nitrogen. Toluene, ethylene and propylene were passed through two purification columns packed with activated alumina and supported copper catalyst. 1-Hexene and chloroforn-$d_3$ were distilled from calcium hydride and benzene-$d_6$ was distilled from sodium/benzophenone.

I. Metallocene Synthesis

Ethylene-bis(indenyl)zirconium dichloride (Metallocene 1). This complex was prepared as described in Wild, F. R. W. P.; Wasiucionek, M.; Huttner, G.; Brintzinger, H. H. *J. Organomet. Chem.* 1985, 288, 63–7.

Bis(2-phenylindenyl)zirconium dichloride (Metallocene 2). This complex was prepared as described in Bruce, M. D.; Coates, G. W.; Hauptman, E.; Waymouth, R. M.; Ziller, J. W. *J. Am. Chem. Soc.* 1997,119, 11174–11182.

Bis(2-phenylindenyl)hafnium dichloride (Metallocene 3). This complex was prepared as described in Bruce, M. D.; Coates, G. W.; Hauptman, E.; Waymouth, R. M.; Ziller, J. W. *J. Am. Chem. Soc.* 1997, 119, 11174–11182.

Example 1

Preparation of 2-(bis-3,5-trifluoromethylphenyl) indene (Ligand A)

A 3-neck 500 mL round-bottomed flask fitted with a condenser and an addition funnel was charged with 2.62 g (0.11 mol) of Mg turnings and 20 mL of anhydrous diethyl ether. Slow addition of a solution of 25.10 g (0.09 mol) of 3,5-bis(trifluoromethyl)bromobenzene in diethyl ether (100 mL), followed by refluxing for 30 min, gave a brown-grey solution of the aryl Grignard reagent. The solution was cooled to room temperature (RT), filtered over a plug of Celite and evacuated to yield a brown oil. Toluene (40 mL) was added and the suspension cooled to 0° C. whereupon a solution of 2-indanone (9.22 g, 0.07 mol) in toluene (60 mL) was added dropwise to give a tan-brown slurry. This mixture was warmed to room temperature and stirred for an additional 3 hours. After cooling to 0° C. it was quenched with 150 mL of water, hexane (200 mL) added and the reaction mixture neutralized with 5M HCl. The organic layer was separated, and the aqueous layer was extracted with two 50-mL portions of hexane. The combined organic layers were washed with two 50-mL portions of brine and dried over anhydrous magnesium sulfate. After filtration over Celite, the solvent was removed under vacuo yielding 21.5 g (89% based on 2-indanone) of 2-(bis-3,5-trifluoromethylphenyl)indanol as an off-white solid. $^1$H NMR (CDCl$_3$, 23 C., 400 MHz): d 8.05 (s, 2H), 7.80 (s, 1H), 7.5–7.0 (M, 4H), 3.41 (m, 4H), 2.21 (s, 1H, OH). Under argon, this alcohol (21.5 g, 0.06 mol) and p-toluene-sulfonic acid monohydrate (800 mg) were dissolved in toluene (250 mL) and the solution was heated to reflux for 6 hours to afford 14.4 g, (70%) of 2-(bis-3,5(trifluoromethyl)-phenyl) indene upon recrystallization from diethyl ether/hexane at −18 C. $^1$H NMR (CDCl$_3$, 23° C., 400 MHz): d 8.01 (s, 2H), Ar$_f$), 7.75 (s, 1H, Ar$_f$), 7.52 (d, J=7 Hz, 1H), 7.47 (d, J=7 Hz, 1H), 7.43 (s, 1H), 7.33 (dd, 2J=7 Hz, 1H), 7.27 (dd, 2J=7 Hz, 1H), 2.83 (s, 2H). $^{13}$C NMR (CDCl$_3$, 23 C., 100 MHz): L144.3 (s), 143.1 (s), 138.0 (s), 132.1 (q, $^2J_{C-F}$=33 Hz), 130.1 (d, $J_{C-H}$=167 Hz), 127.0 (dd), $J_{C-H}$=160 Hz, $^2J_{C-H}$=7 Hz), 126.0 (dd, $J_{C-H}$=159 Hz, $^2J_{C-H}$=7 Hz)m 125.2 (brd, $J_{C-H}$=162 Hz), 123.9 (dd, $J_{C-H}$=156 Hz, $^2J_{C-H}$=9 Hz), 123.4 (q, $J_{C-F}$=273 Hz, $\underline{C}$F$_3$), 121.8 (dd, $J_{C-H}$=160 Hz, $^2J_{C-H}$=8 Hz), 120.6 (brd, $J_{C-H}$=167 Hz), 38.9 (td, $J_{C-H}$=127 Hz, $^2J_{C-H}$=7 Hz, $\underline{C}$H$_2$). C,H analysis: Anal. Found (Calcd): C, 62.45 (62-20); H 3.01 (3.07).

Example 2

Preparation of Bis(2-(bis-3,5-trifluoromethylphenyl) indenyl)zirconium dichloride, (Metallocene 4)

N-Butyllithium (2.5 M in hexanes, 0.850 mL, 2.13 mmol) was added to a solution of 2-(bis-3,5-trifluoromethylphenyl) indene (648 mg, 1.97 mmol) in toluene (15 mL). The heterogeneous solution was stirred at ambient temperature for 4 hours 30 minutes to give a green-yellow solution which was treated with a suspension of ZrCl$_4$ (240 mg, 1.03 mmol) in toluene (20 mL) via cannula. The yellow suspension was stirred at room temperature for 2.5 hours, heated to ca. 80° C., and filtered over a plug of Celite. After washing the Celite with hot toluene several times (3×10 mL), the filtrate was concentrated and cooled to 18 C. to give 442 mg (55%) of light yellow crystals of Bis(2-(Bis-3,5-trifluoromethylphenyl)indenyl)zirconium dichloride. $^1$H NMR (C$_6$D$_6$, 23 C, 400 MHz): d 7.67 (s, 2H, Ar$_f$), 7.55 (s, 4H, Ar$_f$), 7.19 (m, 4H, Ar), 6.89 (m, 4H, Ar), 5.96 (s, 4H, Cp-H). $^{13}$C NMR (C$_6$D$_6$, 23 C., 100 MHz: d 135.6 (s), 133.1 (s), 131.6 (q, $^2J_{C-F}$=33 Hz), 127.1 (brd, $J_{C-H}$=161 Hz), 126.8 (s), 126.4 (dd, $J_{C-H}$=161 Hz, $^2J_{C-H}$=8 Hz), 125.4 (dd, $J_{C-H}$= 167 Hz), $^2J_{C-H}$=5 Hz), 123.8 (q, $J_{C-F}$=273 Hz, $\underline{C}$-$_F$), 121.8 (brd, $J_{C-H}$=159 Hz), 102.5 (dd, $J_{C-H}$=176 Hz, $^2J_{C-H}$=7 Hz, Cp ($\underline{C}$—H). C,H analysis: Anal. found (Calcd.): C, 49.99 (50.01); H 2.32 (2.22).

Example 3

Preparation of Bis(2-(bis-3,5-trifluoromethylphenyl) indenyl)hafnium dichloride, (Metallocene 5)

N-Butyllithium (1.6M in hexanes, 2 mL. 3.20 mmol) was added dropwise at room temperature to a solution of 2-(bis-3,5-trifluoromethylphenyl)indene (1.03 g. 3.14 mmol) in diethyl ether (10 mL). After stirring for 30 min, the solvent was removed in vacuo leaving a green-yellow solid. In a drybox, HfCl$_4$, (510 mg, 1.59 mmol) was added to the lithium salt. The solids were then cooled to −78° C. at which temperature toluene (45 mL) was slowly added. The flask was allowed to reach ambient temperature and the suspension was stirred for 24 hours after which time it was heated for 15 min to ca. 80° C. (heat gun). The solvent was then removed in vacuo. The solid was extracted with CH$_2$Cl$_2$ (50 mL) and the solution filtered over a plug of Celite. After washing the Celite with 4×15 mL CH$_2$Cl$_2$, the solvent was removed in vacuo from the filtrate. The solid was dissolved in 15 mL of CH$_2$Cl$_2$, filtered and over filtrate a layer of hexane (40 mL) was slowly added. Crystals of Bis(2-(bis-3,5-trifluoromethylphenyl)indenyl)hafnium dichloride Catalyst E were obtained from this layered solution at −18 C. $^1$H NMR (C$_6$D$_6$, 23° C., 200 MHz); d 7.65 (s, 2H, Ar$_f$), 7.51 (s, 4H, Ar$_f$), 6.7–7.3 (m, 8H Ar), 5.63 (s, 4H, Cp—H). $^{13}$C NMR (C$_6$D$_6$ 23° C., 100 MHz); d 135.8 (s), 132.9 (s), 131.6 (q, $^2J_{C-F}$=34 Hz), 127.2 (brd, $J_{C-H}$=160 Hz), 126.3 (dd, $J_{C-H}$=161 Hz, $^2J_{C-H}$=8 Hz), 126.0 (s), 125.6 (dd, $J_{C-H}$=167 Hz, $^2J_{C-H}$=5 Hz), 123.8 (q, $J_{C-F}$=273 Hz, $\underline{C}$F$_3$), 121.7 (brd, $J_{C-H}$=161 Hz), 100.1 (dd, $J_{C-H}$=176 Hz, $^2J_{C-H}$=6 Hz, Cp $\underline{C}$—H). C, H analysis: Anal. Found (Calcd.): C, 45.10 (45-18); H, 1.87 (2.01).

Example 4

1-Methyl-2-(bis-3',5'-trifluoromethylphenyl)indene and 3-methyl-2-(bis-3',5'-trifluoromethylphenyl) indene. (Ligand B)

A solution of 2-bis-3',5'-trifluoromethylphenyl)indene (1.819 g, 5.54 mmol) in tetrahydrofuran (30 mL) was cooled to −78° C. and BuLi (2.5 M in hexanes, 2.33 mL, 5.82 mmol) was added dropwise. The resulting orange-brown solution was allowed to warm to room temperature and stirred for an additional 30 min. Then CH$_3$I (1.20 mL, 19 mmol) was added to this solution and the greenish reaction mixture was stirred for 20 h at room temperature. Methanol (20 mL) was added and the solvents removed in vacuo. The resulting brown solid was extracted with toluene (30 mL) and filtered through a glass frit packed with Celite. The brown solution was washed with H$_2$O (2×10 mL) and saturated NaCl solution (2×10 mL), dried over MgSO$_4$, and then evaporated to dryness. Crystallization from hexanes gave yellow crystals of 5.7 (1.073 g). $^1$H NMR (20° C., CDCl$_3$, 400 MHz): 7.87 (s, 2H), 7.75 (s, 1H), 7.49 (d, 1H, J=7.3 Hz), 7.42 (d, 1H, J=7.6 Hz), 7.37 (t, 1H, J=7.3 Hz), 7.26 (td, 1H, J=7.3 Hz, J=1.2 Hz), 3.78 (s, 2H), 2.33 (s, 3H). Anal. Calcd (Found) for C$_{18}$H$_{12}$F$_6$: C, 63.16 (63.12); H 3.53 (3.62). Repeated crystallization from hexanes gave a mixture of isomers of the ligand (309 mg) in 4:1 ratio. $^1$H NMR: 3.14 (q, 1 H, J=7.0 Hz), 0.87 (d, 3 H, J=7.1 Hz). Overall yield 1.073 g, 73%.

Example 5

Synthesis of (2-phenylindenyl)zirconium trichloride

Solid Zr(NMe$_2$)$_4$ (1.280 g, 4.785 mmol) and 2-phenylindene (0.920 g, 4.785 mmol) were combined with toluene (30 mL) in a 100-mL Schlenk tube and the resulting pale yellow solution was stirred for 2.5 h at room temperature under slightly reduced pressure. Then the solution was evaporated to dryness to give a yellow oil which was extracted with pentane (20 mL) and filtered through a cannula fitted with a double layer of filter paper. The resulting pentane solution was concentrated to a total volume of 10 mL and placed into a −50° C. freezer overnight. The resulting yellow solid was isolated, dried in vacuo, and redissolved in $CH_2Cl_2$ (15 mL). The pale yellow solution was cooled to 0° C. and chlorotrimethylsilane (2 mL, 15.8 mmol) was added via syringe. The bright yellow solution was allowed to warm to room temperature and stirred for 1 h. Then the solution was evaporated to dryness to yield a yellow/orange foamy solid. Toluene (30 mL) was added and the mixture was stirred for 48 h to yield a lemon yellow powder, which was isolated and dried in vacuo (1.098 g, 59% yield). This material was used without further purification.

Example 6

Synthesis of (2-phenylindenyl)(1-methyl-2-phenylindenyl)zirconium di-chloride, (Metallocene 6)

Butyllithium (2.5 M in hexane, 0.43 mL, 1.08 mmol) was added via syringe to the solution of 1-methyl-2-phenylindenyl (212 mg, 1.029 mmol) in diethyl ether (25 mL) at −78° C. The resulting light yellow solution was allowed to warm to room temperature and stirred for additional 30 min. The ether was removed in vacuo to yield a white powdery solid, which was combined with solid (2-phenylindenyl)zirconium trichloride (400 mg, 1.029 mmol) and toluene (50 mL). The resulting suspension was stirred for 24 h at room temperature. Gradually the solids dissolved to give a yellow turbid solution. The mixture was filtered through a glass frit packed with Celite and then evaporated to dryness. The resulting yellow solid was recrystallized from $CH_2Cl_2$ (10 mL) layered with pentane (30 mL) at −50° C. to give metallocene 6., 181 mg, 31% yield. $^1$H NMR (20° C., $C_6D_6$, 400 MHz): d 7.41 (d, 2H, J=11.2 Hz), 7.30 (d, 2H, J =10.8 Hz), 7.24–6.80 (m, 13H), 6.73 (d, 1H, J=11.2 Hz), 6.50 (d, 1H, J=3.2 Hz), 6.26 (d, 1H, J=3.3 Hz), 5.98 (s, 1H), 2.42 (s, 3H). $^{13}$C {$^1$H} NMR (20° C., CDCl$_3$, 125 MHz): d 133.75 (C), 133.10 (C), 132.38 (C), 131.41 (C), 129.54 (C), 129.06 (C—H), 128.90 (C—H), 128.70 (C—H), 128.67 (C—H), 128.14 (C—H), 126.95 (C), 126.72 (C—H), 126.58 (C—H), 126.56 (C—H), 126.43 (C—H), 126.26 (C—H), 125.58 (C—H), 125.05 (C), 124.90 (CH), 124.56 (C), 124.35 (C—H), 123.68 (C—H), 121.43 (C), 104.34 (C—H, Cp), 100.70 (C—H, Cp), 99.00 (C—H, Cp), 12.54 (CH$_3$). Anal. Calcd (Found) for $C_{31}H_{24}Cl_2Zr$: C 66.65 (66.92); H 4.33 (4.36).

Example 7

Synthesis of (2-phenylindenyl)(1-methyl-2-(bis-3',5'-trifluoro-methylphenyl)indenyl)zirconium dichloride, Metallocene 7

Butyllithium (2.5 M in hexanes, 0.43 mL, 1.08 mmol) was added to the pale yellow solution of 1-methyl-2-(bis-3',5'-trifluoromethylphenyl)indene (352 mg, 1.029 mmol) in diethyl ether (20 mL) at −78° C. via syringe. The resulting yellow solution was allowed to warm to room temperature and stirred for additional 30 min. Ether was removed in vacuo to yield a pale yellow solid which was washed with pentane (20 mL) and combined with solid (2-phenylindenyl) zirconium trichloride (400 mg, 1.029 mmol) and toluene (50 mL). The resulting suspension was stirred for 24 h at room temperature. Gradually the solids dissolved to give a yellow turbid solution. This solution was filtered through a glass frit packed with Celite and then evaporated to dryness. The yellow solid 7 was recrystallized from $CH_2Cl_2$ (10 mL) layered with pentane (20 mL) at −50° C.: (245 mg, 34%). $^1$H NMR (20° C., $C_6D_6$, 400 MHz): 7.67 (s, br, 1H), 7.64 (s, br, 2H), 7.30–6.78 (m, 13H), 6.43 (d, 1H, J=2.4 Hz) 6.19 (d, 1H, J =2.4 Hz), 5.59 (s, 1H), 5.32 (s, 1/3H, $CH_2Cl_2$), 2.24 (s, 3H). $^{13}$C {$^1$H} NMR (20° C., CDCl$_3$, 125 MHz): 135.91 (C-H), 133.59 (C), 132.58 (C), 131.47 (C—CF$_3$, $^2J_{C-F}$=33 Hz), 130.76 (C), 130.51 (C), 129.02 (C—H), 128.98 (C—H), 128.80 (C—H), 126.87 (C—H), 126.81 (C—H), 126.77 (C—H), 126.62 (C—H), 126.52 (C—H), 126.25 (C—H), 126.21 (C), 125.34 (C—H), 125.05 (C), 124.09 (C—H), 123.86 (C), 123.23 (CF$_3$, $J_{CF}$=273 Hz), 123.17 (C), 121.24 (C—H, br), 119.25 (C), 102.70 (C—H, Cp), 101.76 (C—H, Cp), 99.30 (C—H, Cp), 12.12 (CH$_3$). Anal. Calcd (Found) for $C_{33}H_{22}Cl_2F_6Zr×1/6.CH_2Cl_2$: C 55.86 (56.20); H 3.37 (3.18). After having been stored for 3–4 weeks in the drybox in a clear vial the yellow compound turned green in color. No changes in $^1$H NMR spectrum were detected upon the color change.

Example 8

Synthesis of (2-(bis-3',5'-trifluoromethylphenyl)indenyl)zirconium trichloride

Solid Zr(NMe$_2$)$_4$ (1.260 g, 4.713 mmol) and 1-methyl-2-(bis-3',5'-trifluoromethylphenyl)indene (1.505 g, 4.58 mmol) were combined with toluene (30 mL) in a 100-mL Schlenk tube and the resulting greenish-brown solution was stirred for 2.5 h at room temperature under slightly reduced pressure. Then the solution was evaporated to dryness to give greenish-brown solid, which was extracted with pentane (30 mL) and filtered through a cannula fitted with a double layer of filter paper. The resulting pentane solution was concentrated to a total volume of 8 mL and placed in a −50° C. freezer overnight. Greenish-brown crystals formed. They were isolated, dried in vacuo and redissolved in $CH_2Cl_2$ (20 mL). The resulting solution was cooled to 0° C. and chlorotrimethylsilane (2 mL, 15.8 mmol) was added via syringe. The turbid yellow solution was allowed to warm to room temperature, stirred for 1 h, concentrated to a total volume of 1 mL and then diluted with toluene (30 mL). The resulting suspension was stirred for 24 h. The lemon yellow powdery solid was isolated and dried in vacuo (1.390 g, 46%). $^1$H NMR (20° C., CDCl$_3$, 400 MHz): 8.19–8.17 (br, 1H), 8.10 (br, 2H), 7.99 (br, 1H), 7.83 (br, 1H), 7.77 (br, 1H), 7.61 (br, 2H), 7.53 (appears as poorly resolved dd, 2H), 7.44–7.38 (br, 1H), 7.30 (br, 2H), 7.20 (m, 1H), 7.03 (br, 2H), 6.95 (s, 1H), 6.83 (br, 1H), 2.45 (br, 6H), 0.41 (s, 9H). Broad peaks in the aromatic region appear to indicate the presence of dimerized or oligomerized forms of (bfmPhIn) ZrCl$_3$. In addition, one NMe$_2$ group (2.45 ppm) and one SiMe$_3$ group (0.41 ppm) per every two 2-bis(3',5'-trifluromethyl)-phenylindenyl entities appear to be coordinated to the metal. This material was used without further purification.

Example 9

Synthesis of (2-(bis-3',5'-trifluoromethylphenyl)indenyl)(1-methyl-2-phenylindenyl)zirconium dichloride, (Metallocene 8)

Butyllithium (2.5 M in hexanes, 0.55 mL, 1.38 mmol) was added to the solution of 1-methyl-2-phenylindene (277 mg, 1.31 mmol) in diethyl ether (25 mL) at −78° C. via syringe. The resulting light yellow solution was allowed to warm to room temperature, stirred for an additional 15 min, and the ether was removed in vacuo to yield a white powdery solid which was combined with solid (2-(bis-3',5'-trifluoromethylphenyl)indenyl)zirconium trichloride.Me$_3$SiNMe$_2$ (695 mg, 1.31 mmol) and toluene (40 mL) at 0° C. The resulting dark green solution was allowed to warm to room temperature and stirred for 40 h during which time the color of the solution gradually turned lemon-yellow. The turbid solution was filtered through a glass frit packed with Celite and then evaporated to dryness. Orange crystals were obtained from a CH$_2$Cl$_2$ (5 mL)/pentane (5 mL) solution stored at −50° C. (200 mg, 28%). $^1$H NMR (20° C., CDCl$_3$, 500 MHz): d 7.84 (s, 2H, br), 7.82 (s, 1H, br), 7.52 (t, 2H, J=7.5 Hz), 7.43 (m, 3H), 7.36 (m, 2H), 7.29 (m, 2H), 7.20 (t, 1H, J=6.0 Hz), 7.08 (q, 2H, J=7.0 Hz), 6.68 (d, 1H, J=2 Hz), 6.38 (d, 1H, J=2 Hz), 5.99 (s, 1H), 5.32 (s, 1/3 H, CH$_2$Cl$_2$), 2.53 (s, 3H). $^{13}$C {$^1$H} NMR (20° C., CDCl$_3$, 125 MHz): d 135.48 (C), 133.20 (C), 132.23 (C), 132.20 (C), 131.62 (C-CF$_3$, $^2$J$_{C-F}$=34 Hz), 130.23 (C), 129.03 (CH), 128.61 (CH), 128.44 (C—H), 126.87 (C—H), 126.71 (C—H), 126.70 (C—H), 126.54 (C—H), 126.45 (C—H), 126.24 (C—H), 125.90 (C), 125.17 (C—H), 125.01 (C), 124.43 (C), 124.15 (C—H), 124.13 (C—H), 123.22 (CF$_3$, J$_{C-F}$=272 Hz), 121.70 (C—H, br), 102.09 (C—H, Cp), 101.20 (C—H, Cp), 98.51 (C—H, Cp), 12.39 (CH$_3$). Anal. Calcd (Found) for C$_{33}$H$_{22}$Cl$_2$F$_6$Zr×1/6.CH$_2$Cl$_2$: C 56.20 (56.11); H 3.18 (3.09).

Example 10

Synthesis of (2-(bis-3',5'-trifluoromethylphenyl)indenyl)(1-methyl-2-(bis-3',5'-trifluoromethylphenyl)indenyl)zirconium dichloride, (Metallocene 9)

Butyllithium (2.5 M in hexanes, 0.40 mL, 1.00 mmol) was added to the solution of 2-(bis-3,5-trifluoromethylphenyl)indene (328 mg, 0.958 mmol) in diethyl ether (30 mL) at −78° C. via syringe. The resulting light yellow solution was allowed to warm to room temperature, stirred for additional 2.5 h and the ether was removed in vacuo to yield a gray powdery solid, which was washed with pentane, filtered, and dried in vacuo. The solid was then combined with solid (2-(bis-3',5'-trifluoromethylphenyl)indenyl)zirconium trichloride-Me$_3$SiNMe$_2$ (508 mg, 0.958 mmol) and toluene (50 mL) and the reaction mixture was stirred for 40 h at room temperature. The turbid yellow solution was filtered through a glass frit packed with Celite and then evaporated to dryness. The resulting solid was extracted with CH$_2$Cl$_2$ (10 mL). The yellow methylene chloride solution was placed in a −50° C. freezer overnight and a yellow precipitate formed (100 mg, 13%). $^1$H NMR (20° C., C$_6$D$_6$, 500 MHz): d 7.56 (s, 2H, br), 7.48 (s, 2H, br), 7.29 (d, 1H, J=8.5 Hz), 7.08 (m, 2H), 6.90 (m, 2H), 6.83 (t, 2H, J=7.0 Hz), 6.66 (t, 1H, J=7.5 Hz), 6.00 (d, 1H, J=2.5 Hz), 5.73 (d, 1H, J=2.5 Hz), 5.48 (s, 1H), 2.14 (s, 3H). $^{19}$F NMR (20° C., C$_6$D$_6$, 282 MHz): 63.65 (s, 3F), 63.57 (s, 3F). $^{13}$C {$^1$H} NMR (20° C., CDCl$_3$, 125 MHz): d 135.61 (C), 133.85 (C), 132.66 (C), 131.64 (C—CF$_3$, $^2$J$_{C-F}$=33 Hz), 131.44 (C-CF$_3$, $^2$J$_{C-F}$=33 Hz), 130.78 (C), 129.03 (CH), 129.00 (CH), 127.85 (C), 126.79 (CH), 126.63 (CH), 126.57 (CH), 126.35 (CH), 125.91 (CH), 124.95 (CH), 124.74 (C), 124.59 (CH), 124.28 (CH), 123.50 (CF$_3$, J$_{C-F}$=273 Hz), 123.15 (CF$_3$, J$_{C-F}$=273 Hz), 122.83 (C), 122.09 (C), 121.89 (CH, br), 121.42 (CH, br), 118.74 (C), 103.28 (CH, Cp), 100.28 (CH, Cp), 99.57 (CH, Cp), 12.17 (CH$_3$). Anal. Calcd (Found) for C$_{35}$H$_{20}$Cl$_2$F$_{12}$Zr: C 50.61 (50.90); H 2.43 (2.72).

Example 11

Synthesis of Bis(2-(bis-3,5-tert-butyl-4-methoxyphenyl)indenyl)zirconium dichloride (Metallocene 10)

A sample of 5.584 g (40 mmol) potassium carbonate and 6.3 mL (100 mmol) iodomethane were reacted with 2.554 g (10 mmol) bis-3,5-tert-butyl4-hydroxybenzoic acid and heated to 45° C. for 30 h. Flash chromatography of the crude product on silica gel with 7.5% ether in hexanes then recrystallisation from hexanes at −20° C. yielded methyl-bis-3,5-tert-butyl-4-methoxybenzoate. Yield: 2.213 g (7.95 mmol, 80%). $^1$H NMR (CDCl$_3$): d 1.42 (s, 18H), 3.68 (s, 3H), 3.87 (s, 3H), 7.93 (s, 2H); $^{13}$C NMR (CDCl$_3$): d 31.91, 35.86, 51.93, 64.40, 124.35, 128.24, 144.01, 163.84, 167.45. The methyl ester (8 mmol) was dissolved in 65 mL of THF in an addition funnel and added to a solution of the di-Grignard of o-xylylenedichloride solution at −78° C. over approx. 60 minutes, consistently maintaining the temperature below −70° C. during the addition. The reaction mixture was warmed to 0° C. in 1–2 h and 80 mL distilled water was added through the addition funnel in 15–30 minutes. After the reaction mixture was allowed to warm to room temperature the THF was removed completely from the reaction mixture. The remaining suspension was acidified to pH=1 and extracted with methylene chloride.The combined organic layers were dried over magnesium sulfate and stirred with 0.300 g (1.57 mmol) para-toluenesulfonic acid monohydrate for 1 h at room temperature. After extraction with distilled water and drying over magnesium sulfate, the crude product was transferred to silica gel and purified by flash chromatography. Yield 2.346 g (7.01 mmol, 87%). $^1$H NMR (CD$_2$Cl$_2$): d 1.47 (s, 18H), 3.71 (s, 3H), 3.79 (s, 2H), 7.14 (s, 1H), 7.15 (td, J=7.0 Hz, J=0.8 Hz), 1H), 7.25 (t, J=7.5 Hz, 1H), 7.37 (d, J=7.5 Hz, 1H), 7.62 (d, J=7.5 Hz, 1H), 7.54 (s, 2H); $^{13}$C NMR (CD$_2$Cl$_2$): d 32.18, 36.09, 39.47, 64.65, 120.88, 123.89, 124.41, 124.68, 125.36, 126.87, 130.67, 143.53, 144.24, 146.05, 147.55, 159.94.

A sample of 1.5 mmol of 2-(bis-3,5-tert-butyl-4-methoxyphenyl)indene was dissolved in 50 mL of diethyl-ether. The solution was cooled down to 0° C. and 0.6 mL (1.5 mmol) n-butyllithium (2.5 M in hexanes) was added dropwise via syringe. The cooling bath was removed and the mixture was stirred at ambient temperature for 10 h and evacuated to dryness. Zirconium tetrachloride, 175 mg (0.75 mmol), and 100 mL toluene was added and the reaction mixture stirred vigorously at 25° C. for 3 days. Toluene was removed in vacuo and 50 mL methylene chloride added. The suspension was filtered over celite through a Schlenk-frit under argon and washed with methylene chloride until the filtered liquid remained colorless. The resulting clear solution's volume was reduced to 1/4 to 1/5 and a layer of pentane, hexanes or diethylether was applied carefully. The layered solution was stored at −80° C. for crystallization of the product. Yield: 293 mg (0.353 mmol, 36%), yellow solid. $^1$H NMR (CD$_2$Cl$_2$): d 1.56 (s, 36H), 3.82 (s, 6H), ), 6.64–6.68 (m, 4H), 6.72 (s, 4H), 6.98–7.01 (m, 4H), 7.63 (s, 4H); $^{13}$C NMR (CD$_2$Cl$_2$): d 32.16, 36.13, 64.67, 104.50, 124.32, 125.48, 126.11, 126.40, 127.03, 129.51, 144.65, 160.45. Anal. Calcd for C$_{48}$H$_{58}$Cl$_2$O$_2$Zr: C, 69.54; H, 7.05. Found: C, 69.41; H, 7.24.

General Polymerization Procedures

METHOD A. Copolymerization of Ethylene and Propylene (<50 mole % E)

A 300-mL stainless steel Parr reactor was charged with liquid propylene (100 mL). Propylene was cooled to the reaction temperature and pressurized with ethylene. The monomer mixture was equilibrated at the reaction temperature under constant ethylene pressure for at least 20 min. Immediately prior to the catalyst injection the ethylene line was. disconnected and the reactor was cooled to 2–3° C. below the reaction temperature to compensate for the anticipated exothermic effect of catalyst injection. In a nitrogen filled drybox a 50-mL pressure tube was charged with zirconocene/MAO solution in toluene (20 mL), removed from the box and pressurized with argon (250 psig). In the case of polymerizations at 0–2° C. the catalyst injection tube was cooled in an ice bath prior to being injected. The reaction was started by catalyst injection. After catalyst injection, the ethylene line was reconnected and the reaction was run for 15–60 min at constant total pressure and temperature. The reaction was quenched by injecting MeOH (20 mL). The polymer was precipitated in acidified MeOH (5% HCl), filtered, washed with MeOH and dried in a vacuum oven at 40° C. to constant weight.

METHOD B. Copolymerization of Ethylene and Propylene (>60 mole % E)

A 300-mL Parr autoclave was charged with 60 mL of liquid propylene and cooled to the reaction temperature. MAO, dissolved in 10 mL of toluene, was injected under ethylene pressure and the reactor was allowed to equilibrate for 10–15 min. Polymerization was initiated by injecting the corresponding zirconocene dichloride solution in 10 mL of toluene under ethylene pressure set to 30–40 psi above the head pressure of preequlibrated ethylene/propylene mixture in the reactor. Polymerization was conducted for 25 min and quenched by injecting 10 mL of methanol under Ar pressure. The reactor was slowly vented and opened. The copolymer was precipitated in acidified methanol (5% HCl), filtered, washed with methanol and dried in a vacuum oven at 40° C. to constant weight.

METHOD C. Ethylene-Hexene Copolymerization

The metallocene was dissolved in 25 mL of toluene in the $N_2$ dry box. Methylaluminoxane (MAO) was dissolved in 35 mL of 1-hexene. The MAO solution was loaded into a 150 mL 2-ended injection tube. Meanwhile, a 300 mL stainless steel Parr reactor was evacuated to 100 mtorr and refilled with Ar. The reactor was flushed three times with 50 psig Ar and then 129 psig ethylene. The MAO solution was introduced to the reactor and was allowed to equilibrate with under the desired head pressure of ethylene for 30 min. 1-Hexene (3.2 mL) and an aliquot of metallocene stock solution (1.8 mL) was introduced to a 25 mL 2-ended injection tube. The ethylene feed was disconnected from the reactor and the pressure was vented by 10 psig. The metallocene solution was injected under the desired head pressure of ethylene to start the reaction. The ethylene feed was immediately reconnected to the reactor. The temperature was controlled at 18° C. throughout the reaction via an ethylene glycol/water cooling loop. The reaction was quenched with methanol injected under Ar pressure after 1 h. The reactor was vented and the copolymer was collected and stirred with acidified methanol overnight. The copolymer was then rinsed with methanol and dried to constant weight in a vacuum oven at 40° C.

METHOD D. Ethylene Homopolymerization

The homopolymerization procedure was identical to that employed in copolymerizations. However, hexane was substituted for 1-hexene as the reaction solvent.

Ethylene-Propylene Copolymer Characterization

Copolymer composition and monomer sequence distribution were determined using $^{13}C$ NMR spectroscopy. Copolymer samples (180–300 mg) were dissolved in 2.5 mL of o-dichlorobenzene/10 vol. % benzene-$d_6$ in 10 mm tubes. The spectra were measured at 140° C. using pulse repetition intervals of 13 s and gated proton decoupling. The isotacticity of propylene triads (%mm) was determined from the ratio of integrals of the first triplet in the methyl region (all $P'''P'''P$ centered triads) over $T_{\beta\beta}$ peak (all PPP triads). The glass transition, melting points and heats of fusion were determined by differential scanning calorimetry using Perkin-Elmer DSC-7. The DSC scans were obtained by first heating copolymer samples to 160° C. for 20 min, cooling them to 20° C. over 2 h, ageing them at room temperature for 24 h and then reheating from −100° C. to 200° C. at 20° C./min. All DSC values in the tables are reheat values. Infrared spectra were obtained by transmission on melt-pressed films using a Perkin-Elmer 1600 FTIR spectrometer. The IR ratio=$A_{993}/A_{975}$, calculated from the absorptivities at 993 and 975 $cm^1$, was averaged over at least three measurements taken in different regions of the film.

Ethylene-1-Hexene Copolymer Characterization

Copolymer composition and monomer sequence distribution were determined using $^{13}C$ NMR spectroscopy. Copolymer samples (180–300 mg) were dissolved in 2.5 mL of o-dichlorobenzene/10 vol. % benzene-d6 in 10 mm tubes. Approximately 5 mg of chromium acetylacetonate was added to samples to decrease spin relaxation times. The spectra were measured at 100° C. using pulse repetition intervals of 5 s and gated proton decoupling. The glass transition, melting points and heats of fusion were determined by differential scanning calorimetry using a Perkin-Elmer DSC-7. The DSC scans were obtained by first heating copolymer samples to 200° C. for 10 min, cooling them to 20° C. at 20° C. per minute, aging them at room temperature for 24 h and then reheating from 0° C. to 200° C. at 20° C./min. All DSC values in the tables are reheat values. Scans to determine the glass transition temperature were obtained by cooling the sample to −150° C. and then heating to 0° C. at 40 ° C./min.

Mechanical tests were performed at 23° C. with ASTM D-1708 dumbell specimens (2.2 cm gauge length) which were die cut from compression molded sheets of about 0.05 cm thickness. Crosshead separation rate was 25.4 cm/min for the three cycle 100% elongation test and 51 cm/min for the tensile and stress relaxation tests.

Tensile tests were run according to ASTM D638-96. Tensile modulus of elasticity was determined as the tangent slope at lowest strain. Elongation after break (percent elongation following break) was measured from benchmarks as immediate set of the center 10 mm section of the specimen. The three cycle recovery test was performed by extension of the specimen three times to 100% elongation with a 30 second hold at each extension and a 60 second hold at each recovery. Cumulative set after the first two cycles was measured from the strain at which stress exceeds the baseline on the third cycle. A stress relaxation test was also conducted by extension to 50% elongation and measuring the decay of the stress.

Examples 12–17

Propylene Homopolymerization with Metallocenes 2,4,6-9

The homopolymerization of propylene was carried out by Method A; results are reported in Table 1.

TABLE 1

Propylene Polymerization with (2-Arylindenyl) Zirconocenes (2, 4, 6–9/MAO).[a]

| Ex. | Catalyst[b] | Productivity[c] | % m[4d] | $M_w$ x10$^{-3e}$ | MWD[e] | ? $H_m$[f] |
|---|---|---|---|---|---|---|
| 12 | 2/MAO | 2 530 | 32 | 542 | 3.48 | 28 |
| 13 | 4/MAO | 1 180 | 72 | 580 | 4.66 | 81 |

TABLE 1-continued

Propylene Polymerization with
(2-Arylindenyl) Zirconocenes (2, 4, 6–9/MAO).[a]

| Ex. | Catalyst[b] | Productivity[c] | % m[4d] | $M_w$ x10$^{-3e}$ | MWD[e] | ? $H_m^f$ |
|---|---|---|---|---|---|---|
| 14 | 6/MAO | 2 800 | 14 | 293 | 3.77 | — |
| 15 | 7/MAO | 1 350 | 31 | 217 | 4.44 | 35 |
| 16 | 8/MAO | 1 810 | 24 | 262 | 3.74 | 26 |
| 17 | 9/MAO | 1 030 | 47 | 270 | 6.50 | 57 |

[a]Reaction conditions: bulk propylene, 20° C., [Zr] = 50 mM, [Zr]:[A1] = 1:1000, $t_{rxn}$ = 30 min.;
[b]2 = (PhInd)$_2$ZrCl$_2$,
4 = (bfmPhIn)$_2$ZrCl$_2$,
6 = (PhInd)(1MePhInd)ZrCl$_2$,
7 = (PhInd)(1MebfmPhIn)ZrCl$_2$,
8 = (bfmPhIn)(1MePhInd)ZrCl$_2$,
9 = (bfmPhIn)(1MebfmPhIn)ZrCl$_2$;
[c](kg · PP)/(mol · Zr · h);
[d]determined by $^{13}$C NMR;
[e]determined by GPC;
[f]determined by DSC

Examples 18–26

Ethylene/Propylene Copolymerization with Metallocenes 1 and 4

The copolymerization of ethylene and propylene was carried out according to Method B to give copolymers with ethylene contents of 60–75%; the results are reported in Table 2. Examples 18–20 are comparative examples prepared with a stereorigid metallocene 1; Examples 21–26 are carried out with catalysts of the present invention. Note the melting polymers prepared by catalysts of the present invention are broader and the heats of fusion higher than polymers produced by comparative bridged catalyst 1.

TABLE 2

Ethylene/Propylene Copolymerization with Et(Ind)$_2$ZrCl$_2$ 1/MAO
and (bfmPhIn)$_2$ZrCl$_2$ 4/MAO.[a]

| Ex. | Catalyst[b] | $T_{pol}$, ° C. | % E[c] | Melting range, ° C.[d] | $T_m$, ° C.[d] | ? $H_m$, J/g[d] |
|---|---|---|---|---|---|---|
| 18 | 1/MAO | 0 | 66 | 110–132 | 124 | 0.55 |
| 19 | 1/MAO | 0 | 68 | 110–134 | 127 | 1.9 |
| 20 | 1/MAO | 0 | 75 | 110–134 | 125 | 0.17[e] |
| 21 | 4/MAO[f] | 2 | 61 | 31–130 | 45, 118 | 14.5[f] |
|    |          |   |    | 75–136  | 123     | 7.1[g] |
| 22 | 4/MAO[f] | 1 | 64 | 31–129 | 45, 119 | 16.8[g] |
|    |          |   |    | 40–130  | 123     | 13.5[e] |
| 23 | 4/MAO[f] | 0 | 67 | 60–136 | 122 | 3.4 |
| 24 | 4/MAO[f] | 0 | 69 | 28–133 | 45, 119 | 17.6[g] |
|    |          |   |    | 40–132  | 122     | 15.4[e] |
| 25 | 4/MAO[f] | 0 | 69 | 30–131 | 42, 120 | 4.8 |
| 26 | 4/MAO[f] | 23 | 60 | 27–126 | 44, 115 | 5.4 |
|    |          |    |    | 30–127 | 44, 115 | 14.1[e] |

[a]Conditions: [Zr] = 1–2 mM, [MAO]:[Zr] = 10 000, $t_{rxn}$ = 25 min, 60 mL liq. P. DSC sample preparation: annealed at 160–180° C. for 20 min, cooled to 25° C. over 2 h, aged for 24–36 h if not otherwise specified.
[b]1 = Et(Ind)$_2$ZrCl$_2$,
4 = (bfmPhIn)$_2$ZrCl$_2$
[c]Mole % ethylene determined by $^{13}$C NMR spectroscopy.
[d]Determined by DSC.
[e]Baseline curved, error may be present in peak area determination.
[f]Two shown values correspond to two runs on different DSC samples prepared from the same polymer sample.
[g]Samples aged for 1 mo.

Examples 27–79

Copolymerization of Ethylene and Propylene with Metallocenes 1,2,4,6–9

Ethylene/Propylene Copolymerizations were carried out according to Method A; reported in Tables 3 and 4.

TABLE 3

First Order Markov Copolymerization Parameters for 1, 2, 4, 6–9/MAO.

| Ex. | Cat.[a] | T ° C. | $N_{exp}^b$ | $X_e/X_p$ in feed[c] | % E in polymer[d] | $r_e r_p^e$ | $r_e^e$ | $r_p^e$ |
|---|---|---|---|---|---|---|---|---|
| 27 | 1/MAO | 1 ± 1 | 5 | 0.04–0.18 | 23–54 | 0.49 ± 0.03 | 5.4 ± 0.6 | 0.09 ± 0.01 |
| 28 | 1/MAO | 20 ± 1 | 1 | 0.07 | 42 | 0.50 | 7.1 | 0.07 |
| 29 | 2/MAO | 1 ± 1 | 5 | 0.06–0.22 | 21–44 | 0.92 ± 0.08 | 3.8 ± 0.3 | 0.25 ± 0.01 |
| 30 | 2/MAO | 20 ± 1 | 5 | 0.06–0.16 | 23–45 | 1.3 ± 0.2 | 5.4 ± 0.9 | 0.24 ± 0.04 |
| 31 | 4/MAO | 1 ± 1 | 5 | 0.07–0.25 | 18–43 | 1.3 ± 0.1 | 4.2 ± 0.7 | 0.31 ± 0.03 |
| 32 | 4/MAO | 20 ± 1 | 5 | 0.05–0.08 | 14–22 | 1.9 ± 0.1 | 6.0 ± 0.2 | 0.33 ± 0.03 |
| 33 | 6/MAO | 1 ± 1 | 1 | 0.09 | 30 | 1.32 | 6.3 | 0.21 |
| 34 | 6/MAO | 19 ± 1 | 2 | 0.08–0.13 | 34–41 | 1.14 ± 0.01 | 6.4 ± 0.6 | 0.18 ± 0.02 |
| 35 | 7/MAO | 0 ± 1 | 4 | 0.04–0.27 | 15–62 | 1.49 ± 0.30 | 7.0 ± 0.39 | 0.21 ± 0.03 |
| 36 | 7/MAO | 19 ± 1 | 3 | 0.04–0.13 | 20–45 | 1.34 ± 0.22 | 8.6 ± 1.3 | 0.15 ± 0.01 |
| 37 | 8/MAO | 0 ± 1 | 1 | 0.26 | 34 | 1.77 | 2.9 | 0.62 |
| 38 | 8/MAO | 18 ± 1 | 3 | 0.08–0.11 | 33–42 | 1.66 ± 0.04 | 9.0 ± 0.2 | 0.19 ± 0.01 |
| 39 | 9/MAO | 0 ± 1 | 2 | 0.03–0.08 | 28–64 | 1.80 ± 0.26 | 7.3 ± 0.5 | 0.25 ± 0.03 |
| 40 | 9/MAO | 20 ± 1 | 5 | 0.05–0.13 | 31–48 | 1.72 ± 0.35 | 10.8 ± 2.7 | 0.16 ± 0.02 |

[a])
1 = Et(Ind)$_2$ZrCl$_2$,
2 = (PhInd)$_2$ZrCl$_2$,
4 = (bfmPhIn)$_2$ZrCl$_2$,
6 = (PhInd)(1MePhInd)ZrCl$_2$,
7 = (PhInd)(1MebfmPhIn)ZrCl$_2$,
8 = (bfmPhIn)(1MePhInd)ZrCl$_2$,
9 = (bfmPhIn)(1MebfmPhIn)ZrCl$_2$;
[b]) number of experiments used for determination of the average reactivity ratios;
[c]) the range of the ratios of the mole fractions of ethylene (Xe) and propylene (Xp);
[d]) the range of mole % E in copolymers determined using $^{13}$C NMR;
[e]) determined using $^{13}$C NMR.

Note that the product of the reactivity ratios ($r_e \cdot r_p$) for metallocenes of the present invention are in the range $1.1 < r_e \cdot r_p < 1.8$ whereas those for comparative metallocene 1 are than 1 ($r_e \cdot r_p = 0.5$).

locene 9 show higher melting range of 44–128° C. with $?H_m = 4.2$ J/g (Example 72).

The compositional heterogeneity of the copolymer sample of Example 78 was investigated by extraction in

TABLE 4

Ethylene-Propylene Copolymers Generated with Catalysts 1, 2, 4 and 6–9/MAO.[a]

| Ex. | Catalyst[b] | $T_{pol}$, °C. | % E[c] | $T_g$, °C.[d] | Melt range, °C. | $T_m$, °C. | $?H_m$, J/g | $M_w \cdot 10^{-3e}$ | MWD[e] |
|---|---|---|---|---|---|---|---|---|---|
| 41 | 1/MAO | 0 | 0 | — | 20–160 | 143 | 125 | 70.6 | 2.0 |
| 42 | 1/MAO | 2 | 11 | −28 | 26–122 | 89 | 63 | 89.4 | 2.3 |
| 43 | 1/MAO | 2 | 23 | −39 | 25–90 | 58 | 9.3 | 78.1 | 2.1 |
| 44 | 1/MAO | 2 | 42 | −52 | none | none | none | 75.2 | 2.0 |
| 45 | 2/MAO | 20 | 0 | −8 | 30–160 | 140 | 31 | 542 | 3.5 |
| 46 | 2/MAO | 20 | 9 | −26 | 30–110 | 65 | 8 | 547 | 5.5 |
| 47 | 2/MAO | 20 | 24 | −26 | none | none | none | 1 312 | 3.6 |
| 48 | 4/MAO | 0 | 0 | — | 20–160 | 147 | 100 | 756 | 5.7 |
| 49 | 4/MAO | 2 | 9 | −21 | 31–122 | 100 | 23 | 2 397 | 5.4 |
| 50 | 4/MAO | 1 | 21 | −31 | 31–142 | 45 | 2.2 | 2 292 | 4.2 |
| 51 | 4/MAO | 1 | 33 | −40 | none | none | none | 2 235 | 2.6 |
| 52 | 4/MAO | 0 | 67 | — | 60–136 | 122 | 3.4 | | |
| 53 | 6/MAO | 20 | 0 | — | none | none | none | 293 | 3.8 |
| 54 | 6/MAO | 18 | 34 | −34 | none | none | none | 596 | 5.3 |
| 55 | 6/MAO | 19 | 41 | — | none | none | none | 633 | 5.2 |
| 56 | 6/MAO | 1 | 30 | −33 | none | none | none | 1 225 | 3.1 |
| 57 | 7MAO | 20 | 0 | −3 | 30–157 | 140 | 35 | 217 | 4.4 |
| 58 | 7MAO | 18 | 20 | −22 | 28–80 | 50 | 3.6 | 334 | 6.0 |
| 59 | 7MAO | 18 | 23 | −25 | 26–84 | 46 | 5.6 | | |
| 60 | 7MAO | 19 | 29 | −31 | 29–120 | 48 | 3.4 | 488 | 5.6 |
| 61 | 7MAO | 19 | 45 | — | none | none | none | 342 | 3.7 |
| 62 | 7MAO | 1 | 0 | −4 | 30–159 | 140 | 32.2 | 367 | 3.3 |
| 63 | 7MAO | 0 | 15 | −16 | 55–109 | 66 | 2.6 | 655 | 3.4 |
| 64 | 7MAO | 1 | 36 | −36 | none | none | none | 845 | 3.1 |
| 65 | 7MAO | 1 | 62 | — | 27–130 | 118 | 8.3 | 869 | 3.4 |
| 66 | 8/MAO | 20 | 0 | −3 | 30–158 | 145 | 26 | 262 | 3.7 |
| 67 | 8/MAO | 17 | 33 | — | none | none | none | | |
| 68 | 8/MAO | 19 | 42 | — | none | none | none | 515 | 4.3 |
| 69 | 8/MAO | 0 | 34 | — | none | none | none | 907 | 3.2 |
| 70 | 9MAO | 20 | 0 | −2.6 | 20–163 | 148 | 57 | 270 | 6.5 |
| 71 | 9MAO | 20 | 31 | — | 61–125 | 73, 115 | 2.4 | 500 | 10.2 |
| 72 | 9MAO | 20 | 33 | −33 | 44–128 | 117 | 4.2 | 450 | 6.2 |
| 73 | 9MAO | 20 | 38 | — | 52–124 | 62, 115 | 2.0 | 558 | 6.8 |
| 74 | 9MAO | 20 | 43 | — | 39–126 | 116 | 1.75 | 495 | 8.8 |
| 75 | 9MAO | 19 | 48 | −43 | 21–123 | 47, 115 | 7.5 | 385 | 5.9 |
| 76 | 9MAO | 20 | 70 | −52 | 64–126 | 117 | 2.9 | 611 | 5.0 |
| 77 | 9MAO | 0 | 28 | −27 | 30–81 | 51 | 4.7 | 781 | 4.2 |
| 78 | 9MAO | 0 | 64 | −48 | 35–125 | 115 | 3.5 | 673 | 3.7 |

[a]) DSC sample preparation: annealed at 160–180° C. for 20 min, cooled to 25° C. over 2 h, aged for 36 h;
[b])
1 = Et(Ind)$_2$ZrCl$_2$,
2 = (PhInd)$_2$ZrCl$_2$,
4 = (bfmPhIn)$_2$ZrCl$_2$,
6 = (PhInd)(1MePhInd)ZrCl$_2$,
7 = (PhInd)(1MebfmPhIn)ZrCl$_2$,
8 = (bfmphIn)(1MePhInd)ZrCl$_2$,
9 = (bfmPhIn)(1MebfmPhIn)ZrCl$_2$;
[c]) Mole % E determined by $^{13}$C NMR spectroscopy;
[d]) Half Cp extrapolated;
[e]) Determined by high temperature GPC.

Note that polymers prepared with metallocene 1 containing 42% ethylene (Example 44) are amorphous, whereas polymers of similar composition (48%E) derived from metallocene 9 (Example 75) are crystalline and exhibit a melting range of 21–123° C. with a heat of fusion of 7.5 J/g. Also note that propylene polymers obtained from metallocene 1 containing 23% ethylene exhibit a melting range of 25–90° C. and $?H_m = 9.5$ J/g (Example 43) whereas propylene polymers containing as much as 33% E derived from metal-boiling heptane. The microstructures of the heptane soluble (50 wt %) and insoluble (50 wt %) fractions of Example 78 were analyzed by Solution $^{13}$C NMR spectroscopy (Table 5). The ethylene contents (%E) of the fractions differ by 3% or less and the reactivity ratios calculated from the dyad distribution differ by less than 0.16 from the average of the whole polymer sample, clearly indicating the compositional homogeneity of these copolymers.

TABLE 5

Fractionation of Ethylene Propylene Copolymer from Metallocene 9

| Example | Sample | % Wt | % E[a] | $r_e r_p$ |
|---|---|---|---|---|
| 78 | Whole | 100 | 64 | 1.54 |
|  | HS | 50 | 61 | 1.46 |
|  | HI | 50 | 64 | 1.70 |

[a] determined by solution $^{13}$C NMR
[b] HS = heptanes soluble
[c] HI = heptanes insoluble

Examples 79–104

The copolymerization of ethylene and 1-hexene was carried out with metallocenes 1, 2, 4, 5 and 9–10 by Method C. The data and characteristics of the polymers are reported in Table 6.

As indicated in Table 6, Comparative Examples 79–83, carried out with bridged metallocene 1 yields random ethylene/hexene copolymers. Polymers made with this metallocene containing 54–69 mol % ethylene are amorphous, exhibiting no melting point by DSC analysis as indicated by "none" under the melt range and $T_m$ columns. In contrast, metallocene 4 of the present invention yields polymers containing 55–70% ethylene with melting points ranging from 26–130° C.

The properties of the ethylene/hexene copolymers of Example 92 and 93 are compared to representative other comparable polyolefin elastomers and reported in Table 7, Parts I and II. Comparative Example 105 is a commercial Ethylene/Octene Elastomer obtained from Dow (Engage 8200$_{tm}$), Comparative Example 106 is an Ethylene/Butene Elastomer obtained from Exxon (Exact 4033$_{tm}$), and comparative Example 107 is a polypropylene elastomer as described in Waymouth et al. U.S. Pat. No. 5,594,080.

TABLE 6

Summary of the DSC and Molecular Weight Data for Ethylene-1-Hexene Copolymers Generated with Catalysts 1, 2, 3, 4, 9 and 10/MAO.[a]

| Ex. | Cat.[b] | $T_{pol}$, ° C. | % E[c] | $T_g$, ° C.[d] | melt range, ° C. | $T_m$, ° C.[a] | ? $H_m$, J/g[a] | $M_w \cdot 10^{-3e}$ | MWD[e] |
|---|---|---|---|---|---|---|---|---|---|
| 79 | 1/MAO | 19 | 54 | −72 | none | none | 0 | 53 | 2.2 |
| 80 | 1/MAO | 18 | 65 | −76 | none | none | 0 | 52 | 2.1 |
| 81 | 1/MAO | 19 | 69 | — | none | none | 0 | 61 | 2.2 |
| 82 | 1/MAO | 18 | 77 | −77 | 37–45 | 43 | 0.3 | 75 | 2.4 |
| 83 | 1/MAO | 18 | 81 | −74 | 33–43 | 40 | 4.7 | 71 | 2.2 |
| 84 | 2/MAO | 18 | 54 | −68 | none | none | 0 | 1176 | 3.2 |
| 85 | 2/MAO | 18 | 59 | — | none | none | 0 | 1353 | 5.5 |
| 86 | 2/MAO | 18 | 64 | −72 | none | none | 0 | 1474 | 7.4 |
| 87 | 4/MAO | 18 | 44 | — | none | none | 0 | 554 | 7.4 |
| 88 | 4/MAO | 18 | 55 | — | 26–126 | 116 | 2.7 | 691 | 6.3 |
| 89 | 4/MAO | 18 | 62 | — | 28–130 | 40, 120 | 8.0 | 994 | 7.6 |
| 90 | 4/MAO | 18 | 66 | — | 61–81 82–124 | 63, 114 | 3.5 | 783 | 6.7 |
| 91 | 4/MAO | 18 | 70 | — | 29–75 76–126 | 38, 121 | 4.2 | 1076 | 9 |
| 92 | 4/MAO | 18 | 73 | — | 23–130 | 37, 119 | 16 | 826 | 6.3 |
| 93 | 4/MAO |  | 80 | −70 | 16–116 | 25, 86 | 15.7 | 1164 | 6.1 |
| 94 | 4/MAO |  | 89 | −59 | 11–117 | 20, 105 | 31 | 1318 | 4.6 |
| 95 | 4/MAO | 18 | 100 | — | 100–145 | 133 | 136 | 1534 | 4.7 |
| 96 | 3/MAO | 18 | 49 | — | none | none | 0 | 1793 | 2.8 |
| 97 | 3/MAO | 18 | 62 | — | 30–50 | 40 | 1.0 | 1287 | 4.8 |
| 98 | 9/MAO | 18 | 68 | — | 14–63 79–114 | 23, 96 | 2.7 | 646 | 5.1 |
| 99 | 9/MAO | 18 | 70 | — | 40–68 92–120 | 22, 108 | 5.4 | 700 | 4.8 |
| 100 | 9/MAO | 18 | 76 | — | 20–67 78–114 | 23, 107 | 4.0 | 901 | 5.8 |
| 101 | 9/MAO | 18 | 79 | — | 15–43 79–114 | 20, 106 | 8.4 | 825 | 4.7 |
| 102 | 10/MAO | 18 | 48 | — | none | none | 0 | 1193 | 4.1 |
| 103 | 10/MAO | 18 | 55 | −74 | 34–127 | 117 | 4.0 | 1335 | 7.8 |
| 104 | 10/MAO | 17 | 64 | −74 | 29–135 | 117 | 5.2 | 1758 | 7.9 |

[a]) DSC sample preparation: annealed at 200° C. for 10 min, cooled to 25° C. at 20° C./min, aged 24 h.
[b])
1 = Et(Ind)$_2$ZrCl$_2$,
2 = (PhInd)$_2$ZrCl$_2$,
4 = (bfmPhIn)$_2$ZrCl$_2$,
3 = (PhInd)$_2$HfCl$_2$,
9 = (bfmPhIn)(1MebfmPhIn)ZrCl$_2$,
10 = (DTBM)$_2$ZrCl$_2$.
[c]) Mole % E determined by $^{13}$C NMR spectroscopy.
[d]) Half Cp extrapolated (DSC).
[e]) Determined by high temperature GPC.

TABLE 7

Mechanical Properties of Polyolefin Elastomers.

Part I

| | Ex. 92 | Ex. 93 | Ex. 94 | Comp. Ex 105 | Comp. Ex 106 | Comp. Ex 107 |
|---|---|---|---|---|---|---|
| Polymer | | | | Engage 8200 | Exact 4033 | polypropylene 37% mmmm |
| Comonomer | Hexene | Hexene | Hexene | Octene | Butene | None |
| Mole % Ethylene | 73 | 80 | 89 | 87 | 89 | 0 |
| PE Melt Index | nd | nd | nd | 5.0 | 0.8 | |
| Mw (× $10^3$) | 826 | 1164 | 1318 | 77.4 | nd | 386 |
| $T_m$ range (° C.) | 23–130 | 16–116 | 11–117 | 20–70 | 20–70 | 40–160 |
| $T_m$ peak (° C.) | 119 | 25, 86 | 20–105 | 66 | 64 | 148 |
| $\Delta H_m$ (J/g) | 16.2 | 15.6 | 31 | 10.5 | 13.7 | |
| $T_g$ (° C.)[a] | — | −66 | −60 | −54 | — | |
| Density (g/cc) | 0.8682 | 0.8694 | 0.8819 | 0.87 | 0.88 | 0.8663 |
| Tensile Strength (MPa) | 3.6 | 4.2 | 8.8 | 9.6 | 16.9 | 12.3 |
| Tensile Modulus (MPa) | 2.9 | 4.0 | 10.3 | 6.9 | 12.3 | 8.9 |
| Elongation at Break (%) | 565 ± 62 | 428 | 360 | 1130 | 750 | 830 |
| Elongation after Break (%) | 90 ± 17 | 26 | 57 | 300 | 210 | 34 |

Part II

| | Ex. 92 | Ex. 93 | Ex. 94 | Comp. Ex 105 | Comp. Ex 106 | Comp. Ex 107 |
|---|---|---|---|---|---|---|
| 100% Elongation 3 Cycle Test: | | | | | | |
| % stress relaxation, 30 s, 1st cycle | 33 | 17 | 17 | 23 | 23 | 39 |
| % retained force, 2nd cycle | 24 | 41 | 29 | 28 | 20 | 29 |
| % set, cumulative | 19 | 13 | 13 | 13 | 11 | 7 |
| Stress Relaxation Test | | | | | | |
| 50% elongation, 5 min | 51 | 33 | 25 | 28 | 28 | 48 |

[a]Determined by Dynamic Mechanical Analysis.

As evident from Table 7, all polyolefin elastomers have a similar density and comparable elastomeric properties. However, the copolymer elastomers of Example 92 and 93 have a particularly useful combination of properties that includes a low glass transition temperature (Tg=−70° C.) and melting ranges that extend to 130° C. Note in particular that while the copolymers of Example 92, and comparative Examples 105 and 106 have similar degrees of crystallinity as manifested by their heats of fusion (?H$_f$(J/g) from 10.5–16.2), the melting point of the copolymer of Example 92 is 119° C. It is unexpected that this high melting point is achieved at a much lower mol % ethylene (73 mol % versus 87 or 89 mol %).

The compositional heterogeneity of these copolymers was investigated by extracting the copolymers in boiling ether and hexanes. The results of these fractionation experiments on the copolymer samples of Example 90 and 91 are reported in Table 8.

TABLE 8

Fractionation of Ethylene/Hexene Copolymers from Metallocene 4

| Example | Sample | % Wt | % E[a] | $T_m$, ° C. | Melt Range, ° C. |
|---|---|---|---|---|---|
| 90 | Whole | 100 | 66 | 63, 114 | 61–81, 82–124 |
| | ES[b] | 16 | 59 | 42 | 35–50 |
| | EI | 84 | 72 | 41, 118 | 29–126 |
| | EI/HxS[c] | 80 | 69 | 45 | 25–85 |
| 91 | Whole | 100 | 70 | 39, 119 | 29–75, 76–126 |
| | ES[b] | 23 | 63 | 35 | 30–43 |
| | EI[c] | 77 | 73 | 35, 119 | 24–129 |
| | EI/HxS[c] | 64 | 67 | 34, 119 | 27–126 |
| | HxI[e] | 13 | 75 | 35, 59, 117 | 24–128 |

[a]determined by solution $^{13}$C NMR.
[b]ES = diethylether soluble.
[c]EI/HxS = diethylether insoluble/hexane soluble.
[d]HxI = hexane insoluble.

Note that the mole fraction of ethylene in the various fractions of the copolymer are all within 10% of the mean mole percent ethylene of the copolymer sample, indicating that these materials have a narrow composition distribution.

Example 108

Synthesis of [1-Benzyl-2-(bis-3',5'-tert-butyl)phenylindenyl](2-Phenylindenyl)zirconium dichloride (Metallocene 11)

3,5-Di-tert-butylbenzoic acid (2g, 8.5 mmol) was dissolved in methanol (50 ml). Thionyl chloride (0.94 ml, 13 mmol) was added at 0° C. The mixture was stirred at room temperature for 16 hours. The solvent was removed under vacuum, and the residual solid, methyl-bis-3,5-tert-butylbenzoate, was used without purification (1.92 g, 91%). $^1$H NMR (CDC$_3$): δ1.33 (18H, s), 3.89 (3H, s), 7.60 (1H, m), 7.87 (2H, m). $^{13}$C{$^1$H}NMR (CDCl$_3$): δ31.35, 34.92, 51.98, 123.76, 127.05, 129.49, 150.99, 167.80.

Magnesium powder (1.65 g, 68 mmol) was activated with 1,2-dibromoethane (0.366 ml, 4.25 mmol) in THF (15 ml). The solvent was removed under vacuum. THF (125 ml) was used to dissolve o-xylylene dichloride (3 g, 17 mmol), and the solution was added dropwise to the activated magnesium at room temperature over 2 hours. The solution was stirred at room temperature for 16 hours. Methyl-bis-3,5-tert-butylbenzoate (2.81 g, 11.3 mmol) was dissolved in THF (125 ml) and added dropwise to the Grignard solution over 2 hours at –78° C. The mixture was warmed to room temperature and stirred for 16 hours. Water was added to quench excess Grignard and the solution was acidified with hydrochloric acid to pH ~1. The product was extracted with ether, dried over MgSO$_4$, and the solvent was removed under vacuum. The solid was dissolved in toluene, p-toluenesulfonic acid (0.44 g, 2.6 mmol) was added, and the solution was refluxed for 3 hours. The mixture was washed with water, and the water layer was extracted with ether. The organic layers were combined and dried with MgSO$_4$. Solvent was removed under vacuum. The solid residue, 2-(bis-3',5'-tert-butyl)phenylindene, was purified by flash chromatography in pentane (2.95 g, 85%). $^1$H NMR (CDCl$_3$): δ1.39 (18H, s), 3.84 (2H, s), 7.1–7.5 (7H, m). $^{13}$C{$^1$H} NMR (CDCl$_3$): δ31.46, 34.89, 39.22, 119.97, 120.78, 122.03, 123.58, 124.48, 126.03, 126.53, 135.23, 143.17, 145.56, 147.55, 150.99.

2-(bis-3',5'-tert-butyl)phenylindene (1 g, 3.28 mmol) was deprotonated with n-butyllithium (2.1 ml, 3.36 mmol) in THF at –78° C., and stirred at room temperature for 2 hours. Benzyl bromide (1.2 ml, 10 mmol) was added slowly to the solution, and the mixture was stirred at 40° C. for 24 hours. Solvent was removed under vacuum, and methanol was added to the yellowish residue. The mixture was filtered through a medium glass frit, and the white solid, 1-benzyl-2-(bis-3',5'-tert-butyl)phenylindene, Ligand E, was washed several times with methanol and then dried (0.8 g, 62%). $^1$H NMR (CDCl$_3$): δ1.27 (18H, s), 3.93 (2H, s), 4.18 (2H, s), 7–7.6 (12H, m). $^{13}$C{$^1$H} NMR (CDCl$_3$): δ31.34, 32.20, 34.81, 41.33, 119.81, 121.29, 122.27, 123.35, 124.57, 125.93, 126.37, 128.19, 128.46, 135.83, 136.07, 139.57, 142.56, 143.94, 146.86, 150.77.

1-benzyl-2-(bis-3',5'-tert-butyl)phenylindene (0.5 g, 1.27 mmol) was deprotonated with n-butyllithium (0.8 ml, 1.27 mmol) in ether at 0° C., and stirred at room temperature for 3 hours. The solvent was removed under vacuum, and (2-phenylindenyl)zirconium trichloride (0.494 g, 1.27 mmol) was added. Toluene (50 ml) was added and the reaction was stirred at room temperature for 18 hours. The mixture was Schlenk-filtered through Celite, and the solvent was pumped off under vacuum. The product was isolated by adding pentane to the residue, and then increasing the solubility of the product by adding a small amount of toluene. The product, [1-benzyl-2-(bis-3',5'-tert-butyl)phenylindenyl](2-phenylindenyl)zirconium dichloride, was isolated as a bright yellow powder (0.179 g, 19%). $^1$H NMR (C$_6$D$_6$): δ1.40 (18H, s), 4.63 (1H, d, J$_{HH}$=16.8 Hz), 4.78 (1H, d, J$_{HH}$32 16.8 Hz), 5.95 (1H, s), 6.25 (1H, d, J$_{HH}$=2.2 Hz), 6.56 (1H, d, J$_{HH}$=2.2 Hz), 6.8–7.6 (21H, m). $^{13}$C{$^1$H} NMR (CDCl$_3$): δ31.49, 32.72, 35.00, 100.53, 101.75, 105.09, 122.20, 122.44, 123.64, 124.35, 124.50, 125.00, 125.39, 125.756, 126.04, 126.32, 126.37, 126.50, 126.53, 126.70, 128.07, 128.20, 128.69, 128.83, 132.72, 133.35, 133.83, 139.87, 150.90. Anal. Calc. (Found) for C$_{45}$H$_{44}$Cl$_2$Zr: C 72.36 (72.01), H 5.94 (6.17).

Example 109

Propylene Homopolymerization with Metallocene 11

In a 300 ml stainless steel Parr reactor, 150 mg MAO in 8 ml toluene was equilibrated for 30 minutes at 20° C., with 90 ml liquid propylene. A solution of metallocene (2.68× 10$^{-6}$ mol) in toluene (2 ml) was injected into the reactor via argon pressure (250 psig). The polymerization was run for 20 minutes and then quenched with methanol (10 ml). The polypropylene was precipitated from acidified methanol, filtered, washed with methanol, and dried under vacuum at 40° C.

The catalyst productivity was 312 kg/mol·Zr·h. The isotacticity index (%m$^4$) was 24%, as determined by $^{13}$C NMR. The melting range of the polypropylene was 30–155° C. (peak melting temperature, T$_m$=135° C.), and the heat of fusion (ΔH$_m$) was 17.4 J/g, as determined by DSC. The number average and weight average molecular weights, M$_n$=25 400 and M$_w$=73 100, and the polydispersity, PDI= 2.9, were determined by GPC.

Examples 110–115

Ethylene/Propylene Copolymerization with Metallocene 11

The ethylene/propylene copolymerizations were carried out as follows. In a 300 ml stainless steel Parr reactor, 100 mg MAO in 18 ml toluene was equilibrated for 30 minutes at 20° C., with 100 ml liquid propylene and gaseous ethylene overhead pressure. Metallocene solution (2 ml in toluene) was injected into the reactor via ethylene pressure, and the polymerization was run for 20 minutes, after which methanol (10 ml) was injected to quench the reaction. The ethylene/propylene copolymer was precipitated from acidified methanol, filtered, washed with methanol, and dried under vacuum at 40° C. The results of these copolymerizations are given in Table 9, and the DSC traces are shown in FIG. 3.

TABLE 9

Ethylene/Propylene Copolymerization with Metallocene (1BztBu)(2PhInd)ZrCl$_2$, 11/MAO

| Ex. | % E[a] | Productivity (kg/mol · Zr · h) | X$_e$/X$_p$[b] | r$_e$[c] | r$_p$[c] | r$_e$r$_p$[c] | T$_m$[d] (° C.) | ΔH[d] (J/g) | M$_n$[e] (×10$^{-3}$) | M$_w$[e] (×10$^{-3}$) | PDI[e] |
|---|---|---|---|---|---|---|---|---|---|---|---|
| 110 | 40 | 1920 | 0.08 | 13.7 | 0.18 | 2.5 | 35–60 (45) | 2.1 | — | — | — |
| 111 | 45 | 1030 | 0.11 | 12.2 | 0.19 | 2.3 | 35–80 (49) | 5.2 | — | — | — |
| 112 | 50 | 2360 | 0.13 | 12.7 | 0.18 | 2.2 | 35–80 (71) | 6.2 | 109 | 343 | 3.2 |
| 113 | 55 | 4630 | 0.15 | 12.9 | 0.18 | 2.3 | 35–90 (78) | 7.6 | — | — | — |
| 114 | 60 | 7900 | 0.18 | 12.1 | 0.18 | 2.2 | 35–95 (84) | 8.0 | — | — | — |
| 115 | 100 | 3450 | — | — | — | — | 139 | 163 | 169 | 780 | 4.6 |

[a]) Mole % ethylene in the polymer, determined by $^{13}$C NMR.
[b]) Ratio of mole fractions of ethylene and propylene in the feed.
[c]) Reactivity ratios of ethylene (r$_e$), propylene (r$_p$), and their product (r$_e$r$_p$), determined by $^{13}$C NMR.
[d]) Determined by DSC. Samples aged for 36 hours. Numbers in parentheses are peak melting temperatures.
[e]) Determined by GPC.

Examples 116–124

Ethylene/1-Hexene Copolymerization with Metallocene 11

The ethylene/propylene copolymerizations were carried out as follows. In a 300 ml stainless steel Parr reactor, 100 mg MAO in 35 ml 1-hexene was equilibrated for 30 minutes at 20° C., with gaseous ethylene overhead pressure. Catalyst solution (5 ml in toluene/1-hexene) was injected into the reactor via ethylene pressure, and the polymerization was run for 20 minutes, and then quenched with methanol (10 ml). The ethylene/1-hexene copolymer was precipitated from acidified methanol, filtered, washed with methanol, and dried under vacuum at 40° C. The results of these copolymerizations are given in Table 10, and the DSC traces are shown in FIG. 4.

industry, inter alia, as elastomers having higher melting points than currently available elastomers, as thermoplastic materials, and as components for blending with other polyolefins for predetermined selected properties, such as raising the melting point of the blend. As noted in Table 7 and the accompanying discussion, typical polymers of this invention, while they have degrees of crystallinity similar to that of Dow's Engage 8200$_{tm}$ and EXXON's 4033$_{tm}$, they have a broader melting point range that extends to higher temperatures, e.g., to 130° C., and above.

It should be understood that various modifications within the scope of this invention can be made by one of ordinary skill in the art without departing from the spirit thereof. We therefore wish this invention to be defined by the scope of the appended claims as broadlly as the prior art will permit, and in view of the specification if need be.

TABLE 10

Ethylene/1-Hexene Copolymerization with Metallocene (1BztBu)(2PhInd)ZrCl$_2$, 11/MAO

| Ex. | % E[a] | Productivity (kg/mol · Zr · h) | X$_e$/X$_h$[b] | r$_e$[c] | r$_h$[c] | r$_e$r$_h$[c] | T$_m$[d] (° C.) | ΔH[d] (J/g) | M$_n$[e] (×10$^{-3}$) | M$_w$[e] (×10$^{-3}$) | PDI[e] |
|---|---|---|---|---|---|---|---|---|---|---|---|
| 116 | 49 | 1260 | 0.06 | 22.2 | 0.08 | 1.8 | 30–65 (42) | 0.9 | 33.3 | 135 | 4.1 |
| 117 | 61 | 2100 | 0.08 | 26.3 | 0.07 | 1.9 | 28–80 (39) | 5.2 | 56.5 | 214 | 3.8 |
| 118 | 68 | 2380 | 0.11 | 24.7 | 0.08 | 1.8 | 25–90 (36, 73) | 10.7 | 77.9 | 278 | 3.6 |
| 119 | 72 | 4160 | 0.15 | 23.2 | 0.08 | 1.9 | 25–95 (36, 79) | 14.2 | — | — | — |
| 120 | 75 | 7800 | 0.18 | 20.1 | 0.09 | 1.8 | 25–100 (37, 86) | 18.7 | 142 | 562 | 4.0 |
| 121 | 80 | 11 900 | 0.23 | 20.2 | 0.09 | 1.8 | 28–104 (37, 89) | 18.0 | — | — | — |
| 122 | 84 | 14 800 | 0.28 | 20.4 | 0.09 | 1.8 | 28–105 (37, 93) | 21.4 | 169 | 818 | 4.8 |
| 123 | 85 | 16 100 | 0.31 | 19.9 | 0.10 | 2.0 | 28–106 (37, 94) | 23.2 | — | — | — |
| 124 | 85 | 21 900 | 0.31 | 20.2 | 0.10 | 2.0 | 28–106 (36, 94) | 25.2 | — | — | — |

[a]) Mole % ethylene in the polymer, determined by $^{13}$C NMR.
[b]) Ratio of mole fractions of ethylene and 1-hexene in the feed.
[c]) Reactivity ratios of ethylene (r$_e$), 1-hexene (r$_h$), and their product (r$_e$r$_h$), determined by $^{13}$C NMR.
[d]) Determined by DSC. Samples aged for 36 hours. Numbers in parentheses are peak melting temperatures.
[e]) Determined by GPC.

INDUSTRIAL APPLICABILITY

It is evident that the polymers of the present invention, and the polymerization catalysts and processes by which the polymers are produced will have wide applicability in

We claim:

1. An unbridged fluxional metallocene catalyst component which exhibits plural coordination geometries for olefin polymerization, a) said fluxional catalyst having the formula:

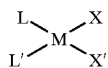

wherein M is a Group 3, 4 or 5 Transition metal, a Lanthanide or an Actinide; X and X' are the same or different uninegative ligands, L and L' are fluxional ligands, and at least one of said ligands L and L' is selected from a cyclopentadiene of the formula:

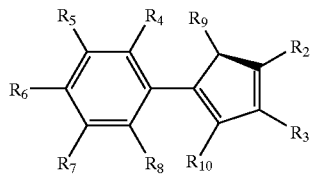

wherein $R_2$ through $R_8$ are the same or different hydrogen, halogen, or substituted or unsubstituted alkyl, alkylsilyl, aryl, benzyl, alkoxyalkyl, alkoxyaryl, alkoxysilyl, aminoalkyl, or aminoaryl substituents, of 1 to about 30 carbon atoms, and at least one of $R_9$ or $R_{10}$ is halogen, or a substituted or unsubstituted alkyl, alkylsilyl, aryl, benzyl, alkoxyalkyl, alkoxyaryl, alkoxysilyl, aminoalkyl, or aminoaryl substituent, of 1 to about 30 carbon atoms; and b) said fluxional catalyst interconverts between states having different polymerization characteristics based on said substituents of the cyclopentadienyl ligands causing plural coordination geometries having a rate of interconversion between states within several orders of magnitude greater than the rate of formation of a single polymer chain.

2. An unbridged fluxional catalyst component as in claim 1 wherein $R_2$ and $R_3$ are connected as part of a ring of 3 or more carbon atoms.

3. An unbridged fluxional catalyst component as in claim 2 wherein said aryl substituent is a 2-aryl indene of the formula:

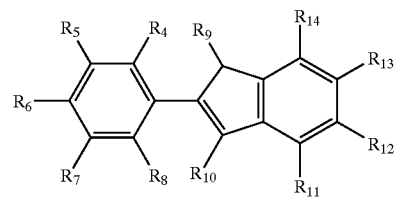

wherein $R_4$ through $R_8$ and $R_{11}$ through $R_{14}$ are the same or different hydrogen, halogen, or substituted or unsubstituted aryl, benzyl, alkyl, branched alkyl, hydrocarbyl, silahydrocarbyl or halo-hydrocarbyl substituents, of 1 to about 30 carbon atoms, and at least one of $R_9$ or $R_{10}$ is halogen, or a substituted or unsubstituted aryl, benzyl, alkyl, branched alkyl, hydrocarbyl, silahydrocarbyl or halo-hydrocarbyl substituent, of 1 to about 30 carbon atoms.

4. An unbridged fluxional metallocene catalyst component as in claim 3 wherein said 2-aryl indene is selected from: 2-phenylindene; 1-methyl-2-phenyl indene; 2-(3,5-dimethylphenyl) indene; 2-(3,5-bis-tri-fluoromethylphenyl) indene; 1-methyl-2-(3,5-bis-trifluoromethylphenyl) indene; 2-(3,5-bis-tertbutylphenyl)indene; 1-methyl-2-(3,5-bis-tertbutylphenyl)indene; 2-(3,5-bis-tri-methylsilylphenyl) indene; 1-methyl-2-(3,5-bis-trimethylsilylphenyl)indene; 2-(4-fluoro-phenyl) indene; 2-(2, 3, 4, 5-tetrafluorophenyl) indene; 2-(2, 3, 4, 5, 6-pentafluorophenyl)indene; 2-(1-naphthyl)indene; 2-(2-naphthyl)indene; 2-[(4-phenyl) phenyl]indene; 2-[(3-phenyl)phenyl]indene; 1-benzyl-2-(3, 5-bis-tertbutylphenyl)indene or 1-benzyl-2-phenylindene.

5. An unbridged fluxional metallocene catalyst component as in claim 1 wherein L and L' are different fluxional ligands.

6. An unbridged fluxional metallocene catalyst component as in claim 1 wherein said coordination geometries provide different copolymerization characteristics.

* * * * *